(12) United States Patent  
Chen et al.

(10) Patent No.: US 8,917,745 B2
(45) Date of Patent: Dec. 23, 2014

(54) CHANNEL BONDING WITH ORBITAL ANGULAR MOMENTUM

(71) Applicant: Broadcom Corporation, Irvine, CA (US)

(72) Inventors: Xuemin Chen, Rancho Santa Fe, CA (US); Bradley Blanche, Aliso Viejo, CA (US); Gordon Li, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 83 days.

(21) Appl. No.: 13/715,237

(22) Filed: Dec. 14, 2012

(65) Prior Publication Data

US 2013/0235885 A1 Sep. 12, 2013

Related U.S. Application Data

(60) Provisional application No. 61/663,878, filed on Jun. 25, 2012, provisional application No. 61/609,339, filed on Mar. 11, 2012.

(51) Int. Cl.
*H04J 3/16* (2006.01)
*H04L 12/24* (2006.01)
*H04L 5/00* (2006.01)
*H04L 25/14* (2006.01)

(52) U.S. Cl.
CPC .......... *H04L 41/0896* (2013.01); *H04L 5/0044* (2013.01); *H04L 25/14* (2013.01)
USPC ........................................................ 370/468

(58) Field of Classification Search
None
See application file for complete search history.

(56) References Cited

U.S. PATENT DOCUMENTS

| 6,404,769 | B1* | 6/2002 | Kapoor | 370/398 |
|---|---|---|---|---|
| 8,396,371 | B2* | 3/2013 | Murshid et al. | 398/141 |
| 2003/0122954 | A1* | 7/2003 | Kassatly | 348/335 |
| 2010/0017548 | A1* | 1/2010 | Iwahashi et al. | 710/56 |
| 2010/0061234 | A1* | 3/2010 | Pai et al. | 370/230.1 |
| 2012/0263466 | A1* | 10/2012 | Djordjevic et al. | 398/65 |
| 2013/0235744 | A1* | 9/2013 | Chen et al. | 370/252 |
| 2013/0239150 | A1* | 9/2013 | Chen et al. | 725/62 |
| 2013/0239159 | A1* | 9/2013 | Mamidwar et al. | 725/109 |
| 2013/0239160 | A1* | 9/2013 | Chen et al. | 725/109 |
| 2013/0239161 | A1* | 9/2013 | Chen et al. | 725/109 |

OTHER PUBLICATIONS

B. Thide, et al., *Utilization of photon orbital angular momentum in the low-frequency radio domain*, May 2007, pp. 1-4.

Johan Sjoholm, et al., *Angular Momentum of Electromagnetic Radiation, Fundamental physics applied to the radio domain for innovative studies of space and development of new concepts in wireless communications*, Diploma Thesis, May 2, 2007, Uppsala School of Engineering and Department of Astronomy and Space Physics, Uppsala University, Sweden, pp. 1-186.

H. Then, et al., *Detecting orbital angular momentum in radio signals*, arXiv:0805.2735v1 [astro-ph], May 18, 2008, pp. 1-5.

* cited by examiner

*Primary Examiner* — Anh-Vu Ly
(74) *Attorney, Agent, or Firm* — Brinks Gilson & Lione

(57) ABSTRACT

Different data communication architectures deliver a wide variety of content, including audio and video content, to consumers. The architectures employ channel bonding to deliver more bandwidth than any single communication channel can carry. In some implementations, the communication architectures distribute data across multiple orbital angular momentum channels in the bonded channel group.

13 Claims, 34 Drawing Sheets

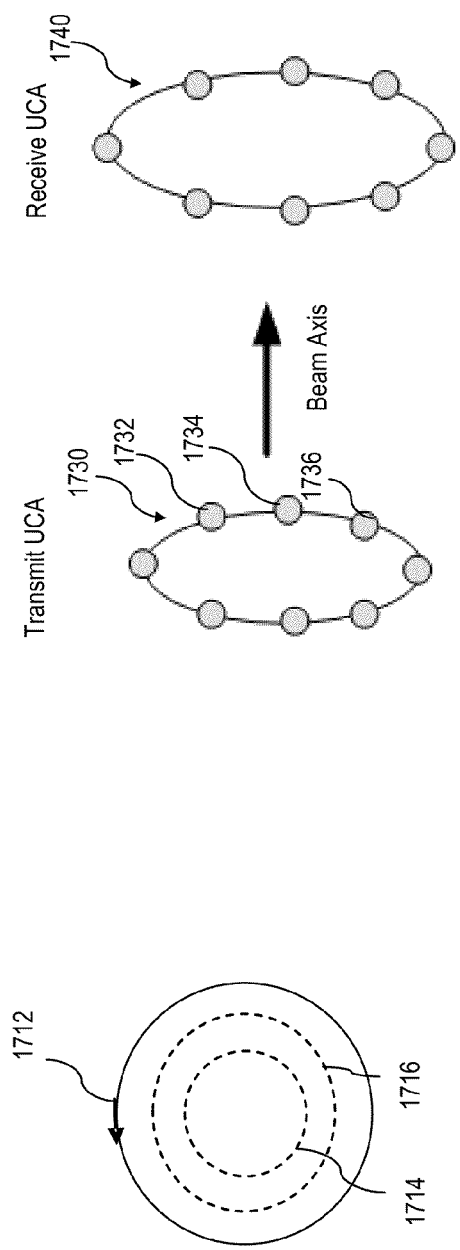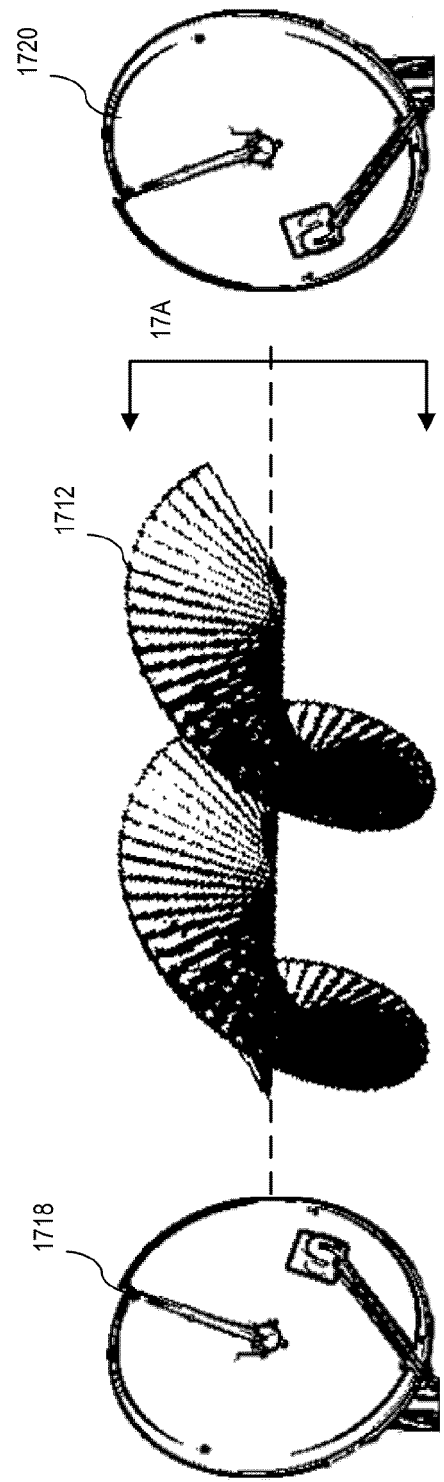
Figure 17A
Figure 17B
Figure 17C

CHANNEL BONDING WITH ORBITAL ANGULAR MOMENTUM

CROSS REFERENCE TO RELATED APPLICATIONS

This application claims the benefit of and priority to U.S. Provisional Application Ser. No. 61/663,878, filed Jun. 25, 2012, entitled, "Channel Bonding-Audio-Visual-Broadcast," and U.S. Provisional Application Ser. No. 61/609,339, filed Mar. 11, 2012, entitled, "Method and Apparatus for Using Multiple Physical Channels for Audio-Video Broadcasting and Multicasting," the contents of each of which are hereby incorporated by reference in their entireties.

TECHNICAL FIELD

This disclosure relates to communication techniques. In particular, this disclosure relates to channel bonding with orbital angular momentum (OAM).

BACKGROUND

Rapid advances in electronics and communication technologies, driven by immense private and public sector demand, have resulted in the widespread adoption of smart phones, personal computers, internet ready televisions and media players, and many other devices in every part of society, whether in homes, in business, or in government. These devices have the potential to consume significant amounts of audio and video content. At the same time, data networks have been developed that attempt to deliver the content to the devices in many different ways. Further improvements in the delivery of content to the devices will help continue to drive demand for not only the devices, but for the content delivery services that feed the devices.

BRIEF DESCRIPTION OF THE DRAWINGS

The innovation may be better understood with reference to the following drawings and description. In the figures, like reference numerals designate corresponding parts throughout the different views.

FIG. 17A is an illustration of orbital angular momentum.

FIG. 17B is an illustration of an antenna structure that may be used for generating and/or detecting orbital angular momentum signals in accordance with one or more embodiments.

FIG. 17C is an illustration of an antenna array that may be used for generating and/or detecting orbital angular momentum signals in accordance with one or more embodiments.

DETAILED DESCRIPTION

Figure 1:
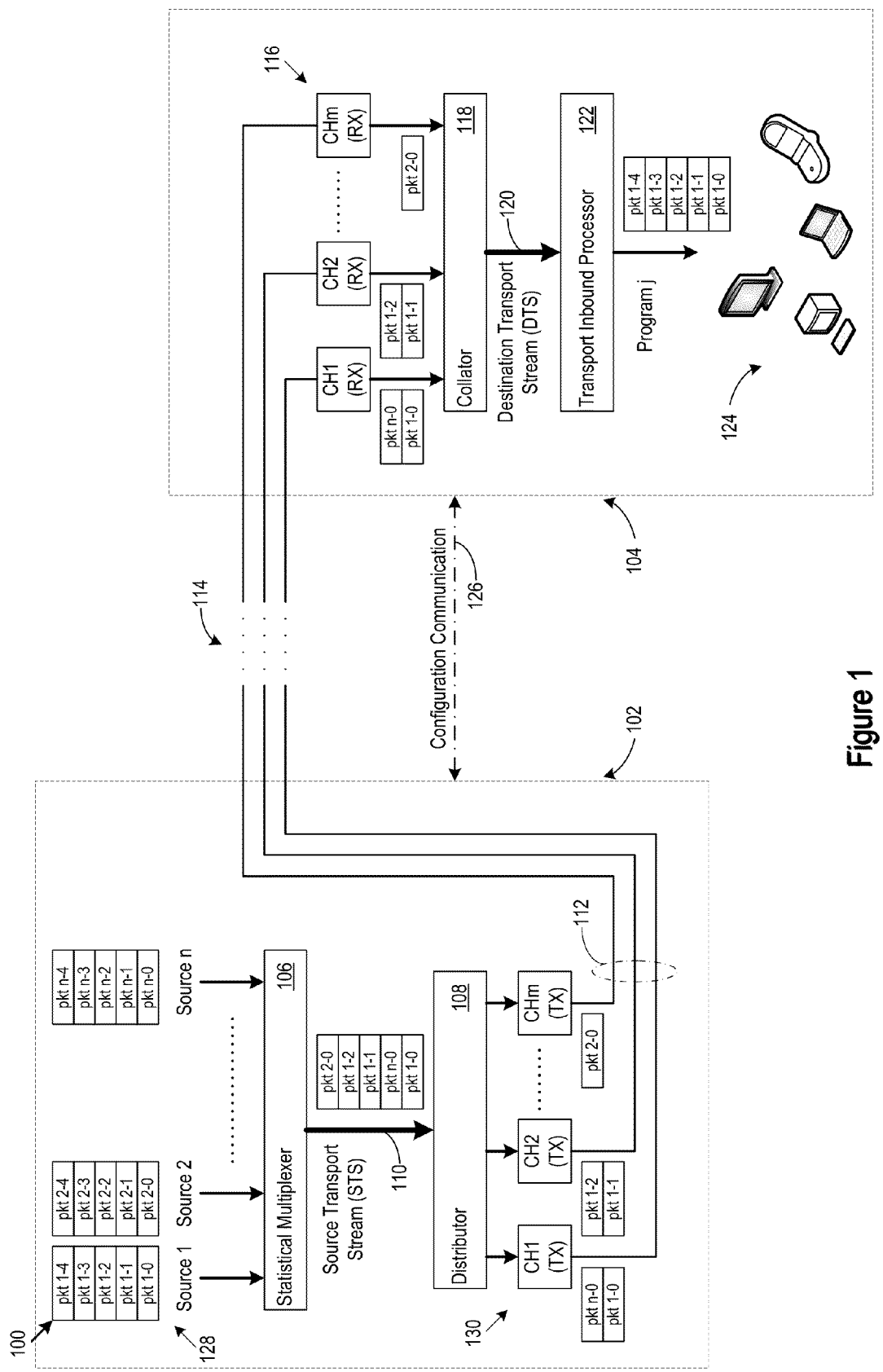
FIG. 1 shows an example of a content delivery architecture that employs channel bonding.

FIG. 1 shows an example content delivery architecture 100. The architecture 100 delivers data (e.g., video, audio and/or graphic content, streams, or programs or other types of content that may be transmitted) from a source 102 to a destination 104. In one or more embodiments, the source 102 may include satellite, cable, or other media providers, and may represent, for example, a head-end distribution center that delivers content to consumers. In one embodiment, the source 102 may receive the data from one or more content inputs 128 in the form of Motion Picture Expert Group 2 (MPEG2) Transport Stream (TS) packets, when the data is audio/visual programming, for example. The source 102 may receive data for transmission to the destination 102 in any format compatible with the teachings of the present disclosure. The destination 104 may be a home, business, mobile device, or other location, where, for example, a processing device (e.g., a set top box) processes the data sent by and received from the source 102.

In one or more embodiments, the source 102 may include a statistical multiplexer 106 and a distributor 108. The statistical multiplexer 106 helps make data transmission efficient by reducing idle time in the source transport stream (STS) 110. In that regard, the statistical multiplexer 106 may interleave data from multiple input sources together to form the transport stream 110. For example, the statistical multiplexer 106 may allocate additional STS 110 bandwidth among high bit rate program channels and relatively less bandwidth among low bit rate program channels to provide the bandwidth needed to convey widely varying types of content at varying bit rates to the destination 104 at any desired quality level. Thus, the statistical multiplexer 106 very flexibly divides the bandwidth of the STS 110 among any number of input sources.

Several input sources 128 are present in FIG. 1: content input 1, content input 2, . . . , content input n. There may be any number of such input sources 128 carrying any type of audio, video, graphics or other type of data (e.g., web pages or file transfer data) and in any type of format. Specific examples of source data include MPEG or MPEG2 TS packets for digital television (e.g., individual television programs or stations), H.264/MPEG-4 Part 10 or AVC (Advanced Video Coding) video, High Efficiency Video Coding (HVEC) video (e.g., H.265/MPEG-H), 4K×2K video, and 8K×4K video, but the content input sources 128 may provide any type of input data. The source data from the input content sources 128 (e.g., the MPEG 2 packets) may include program identifiers (PIDs) that indicate a specific program (e.g., which program, channel, television station, etc.) to which the data in the packets belongs.

In one or more embodiments, the STS 110 may have a data rate that exceeds the transport capability of any one or more communication links between the source 102 and the destination 104. For example, the STS 110 data rate may exceed the data rate supported by a particular communication channel exiting the source 102 such that multiple communication channels may be required and/or desired to accommodate the overall data rate for the STS 110. To help deliver the aggregate bandwidth of the STS 110 to the destination 104, the source 102 includes a distributor 108 and modulators 130 that feed a bonded channel group 112 of multiple individual communication channels. In other words, the source 102 distributes the aggregate bandwidth of the STS 110 across multiple outgoing communication channels that form a bonded channel group 112, and that together provide the bandwidth for communicating the data in the STS 110 to the destination 104.

The distributor 108 may be implemented in hardware, software, or both. The distributor 108 may determine which data in the STS 110 to send on which communication channel. As will be explained in more detail below, the distributor 108 may divide the STS 110 into chunks of one or more packets. The chunks may vary in size over time, based on the communication channel that will carry the chunk, the program content in the chunk, or based on any other desired chunk decision factors implemented in the distributor 108. The distributor 108 may forward any particular chunk to the modulator for the channel that the distributor 108 has decided will convey that particular chunk to the destination 104.

In that regard, the multiple individual communication channels within the bonded channel group 112 provide an aggregate amount of bandwidth, which may be less than, equal to, or in excess of the aggregate bandwidth of the STS 110. As just one example, there may be three 30 Mbs physical cable channels running from the source 102 to the destination 104 that handle, in the aggregate, up to 90 Mbs. The communication channels in the bonded channel group 112 may be any type of communication channel, including xDSL (e.g., VDSL, VDSL2, ADSL or ADSL 2 channels), coaxial cable channels, wireless channels such as satellite channels or IEEE 802.11 a/b/g/n/ac channels or 60 GHz WiGig channels, Cable TV channels, WiMAX/IEEE 802.16 channels, Fiber optic, xPON (e.g., EPON, GPON, etc.), 10 Base T, 100 Base T, 1000 Base T, power lines, cellular channels (e.g., LTE, 3GPP, etc.), orbital angular momentum (OAM) channels or other types of communication channels.

The bonded channel group 112 travels to the destination 104 over any number of transport mechanisms 114 suitable for the communication channels within the bonded channel group 112. The transport mechanisms 144 may include physical cabling (e.g., fiber optic or cable TV cabling), wireless connections (e.g., satellite, microwave connections, 802.11a/b/g/n connections), or any combination of such connections.

At the destination 104, the bonded channel group 112 is input into individual channel demodulators 116. The channel demodulators 116 recover the data sent by the source 102 in each communication channel. A collator 118 collects the data recovered by the demodulators 116, and may create a destination transport stream (DTS) 120. The DTS 120 may be one or more streams of packets recovered from the individual communication channels as sequenced by the collator 118.

The destination 104 also includes a transport inbound processor (TIP) 122. The TIP 122 processes the DTS 120. For example, the TIP 122 may execute program identifier (PID) filtering for each channel independently of other channels. To that end, the TIP 122 may identify, select, and output packets from a selected program (e.g., a selected program 'j') that are present in the DTS 120, and drop or discard packets for other programs. In the example shown in FIG. 1, the TIP 122 has recovered program 'j', which corresponds to the program originally provided by Source 1. The TIP 122 provides the recovered program to any desired endpoints 124, such as televisions, laptops, mobile phones, and personal computers. The destination 104 may be a set top box, for example, and some or all of the demodulators 116, collator 118, and TIP 122 may be implemented as hardware, software, or both in the set top box.

The source 102 and the destination 104 may exchange configuration communications 126. The configuration communications 126 may travel over an out-of-band or in-band channel between the source 102 and the destination 104, for example in the same or a similar way as program channel guide information, and using any of the communication channel types identified above. One example of a configuration communication is a message from the source 102 to the destination 104 that conveys the parameters of the bonded channel group 112 to the destination 104. More specifically, the configuration communication 126 may specify the number of communication channels bonded together; identifiers of the bonded communication channels; the types of programs that the bonded communication channels will carry; marker packet format; chunk, program packet, or marker packet size; chunk, program packet, or marker packet PID or sequence number information, or any other chunk or bonding configuration information that facilitates processing of the bonded channel group 112 at the destination 104. One example of a configuration communication message from the destination 104 to the source 102 is a configuration communication that specifies the number of communication channels that the destination 104 may process as eligible bonded channels; identifiers of the eligible bonded channels; status information concerning status of the demodulators 116, e.g., that a demodulator is not functioning and that its corresponding communication channel should not be included in a bonded channel group; channel conditions that affect bit rate or bandwidth; or any other information that the source 102 and the distributor 108 may consider that affects processing of the data from the sources into a bonded channel group.

Figure 2:
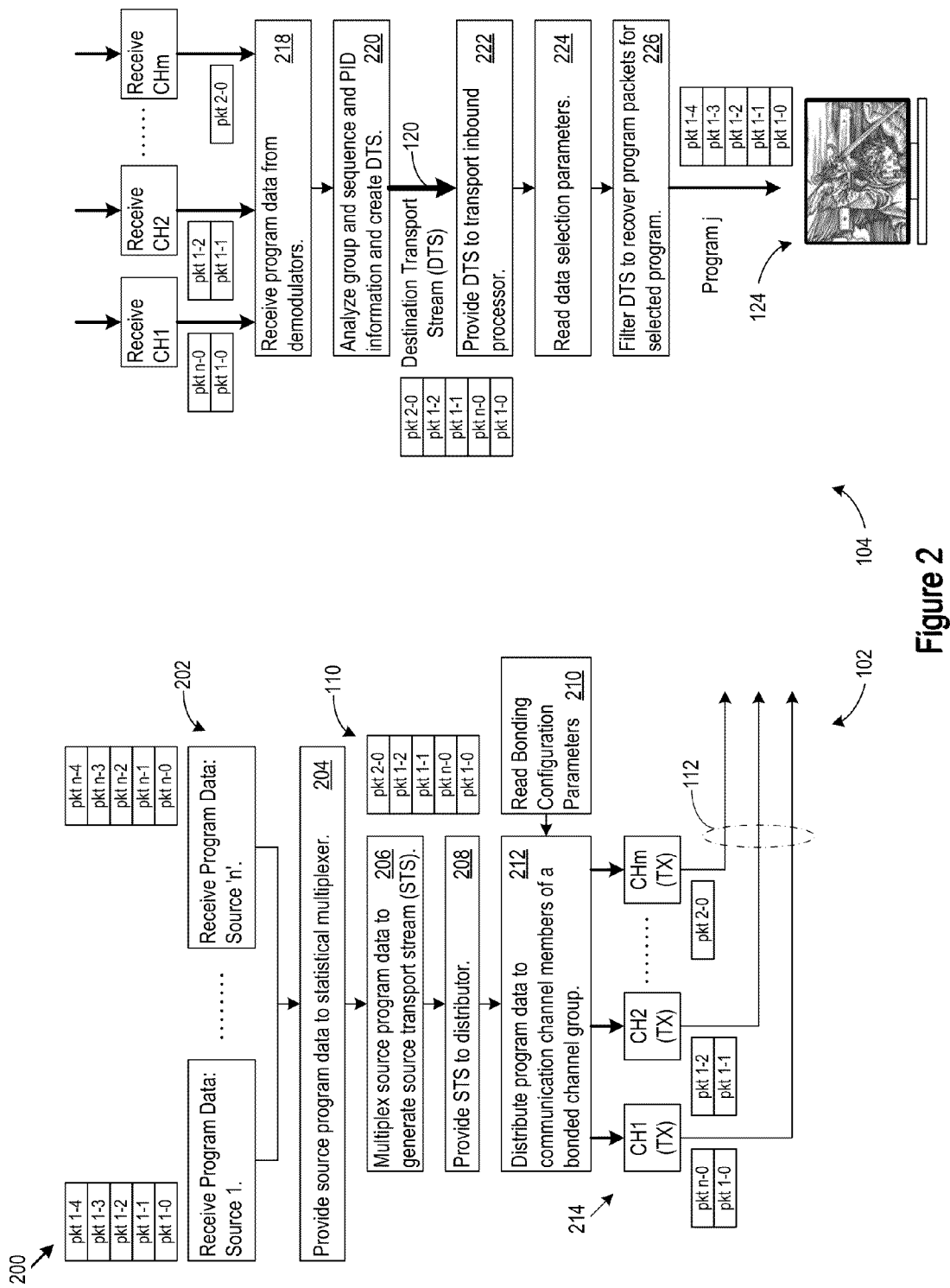
FIG. 2 shows an example of logic for content delivery using channel bonding.

FIG. 2 shows an example of logic 200 for content delivery using channel bonding that the architecture 100 described above may implement in hardware, software, or both. Additional detailed examples are provided below, particularly with regard to marker packets and other options.

In FIG. 2, program data is received from content input sources (e.g., Source 1 . . . Source 'n') (202). The program data may be received from any content provider, and may include any desired audio, visual, or data content, including cable television programming, streaming music, file transfer data, as just three examples. The input sources provide the program data to the statistical multiplexer 106 (204), which multiplexes the program data to generate the source transport stream (STS) 110 (206).

The source 102 provides the STS 110 to the distributor 108 (208). The distributor 108 reads bonding configuration parameters (210). The bonding configuration parameters may specify the number of communication channels in the bonded channel group 112, the communication channels that may be included in the bonded channel group 112, the type of communication channels that may be included in the bonding channel group 112, the program sources eligible for bonding, when and for how long communication channels and program sources are available for channel bonding, bonding adaptation criteria, and any other parameters that may influence how and when the distributor 108 pushes program data across the communication channels in the bonded channel group 112. The distributor 108 sends the program data to the communication channels in the bonded channel group 112 (212). Specific examples of how the distributor 108 accomplishes this are provided below. The source 102 thereby communicates program data to the destination 104 across the multiple communication channels in the bonded channel group 112 (214).

At the destination 104, the demodulators 116 receive the program data over the communication channels (218). The demodulators 116 provide the recovered program data (optionally after buffering) to the collator 118. The collator 118 analyzes group information, sequence information, PIDs, and any other desired information obtained from the data packets arriving on the communication channels and creates a destination transport stream (DTS) 120 from the recovered program data (220). The DTS 120 may convey the program packets in the same sequence as the STS 110, for example.

The collator 118 provides the DTS 120 to the TIP 122 (222). The TIP 122 reads data selection parameters (224). The data selection parameters may specify, for example, which audio/visual program is desired, and may be obtained from viewer input, from automated selection programs or processes (e.g., in a digital video recorder), or in other ways. Accordingly, the TIP 122 filters the DTS 120 to recover the program packets that match the data selection parameters (e.g., by PID filtering) (226). The TIP 122 thereby generates a content output that includes an output packet stream for the selected program. The TIP 122 delivers the generated content to any desired device 124 that consumes the content, such as televisions, smart phones, personal computers, or any other device.

Several channel bonding processing options are discussed next. Some options make reference to marker packets (MPs) inserted into the data streams going to the destination 104 over the communication channels. The marker packets may be MPEG2 TS packets, for example, with an identifier that flags them as MPs. In the first option, the distributor 108 adds marker packets on a per-channel basis, for example in a round-robin manner. In the second option, the distributor 108 generates and adds markers on a per-chunk basis, for example in a round-robin manner at chunk boundaries. In the third option, when packets from the same program will be routed to multiple communication channels, each packet receives a program ID and a sequence ID, and no marker packets are needed. In the fourth option, spare bits in network frames defined below the network layer, e.g., at the data-link layer, carry channel bonding information to the source 104.

Figure 3:
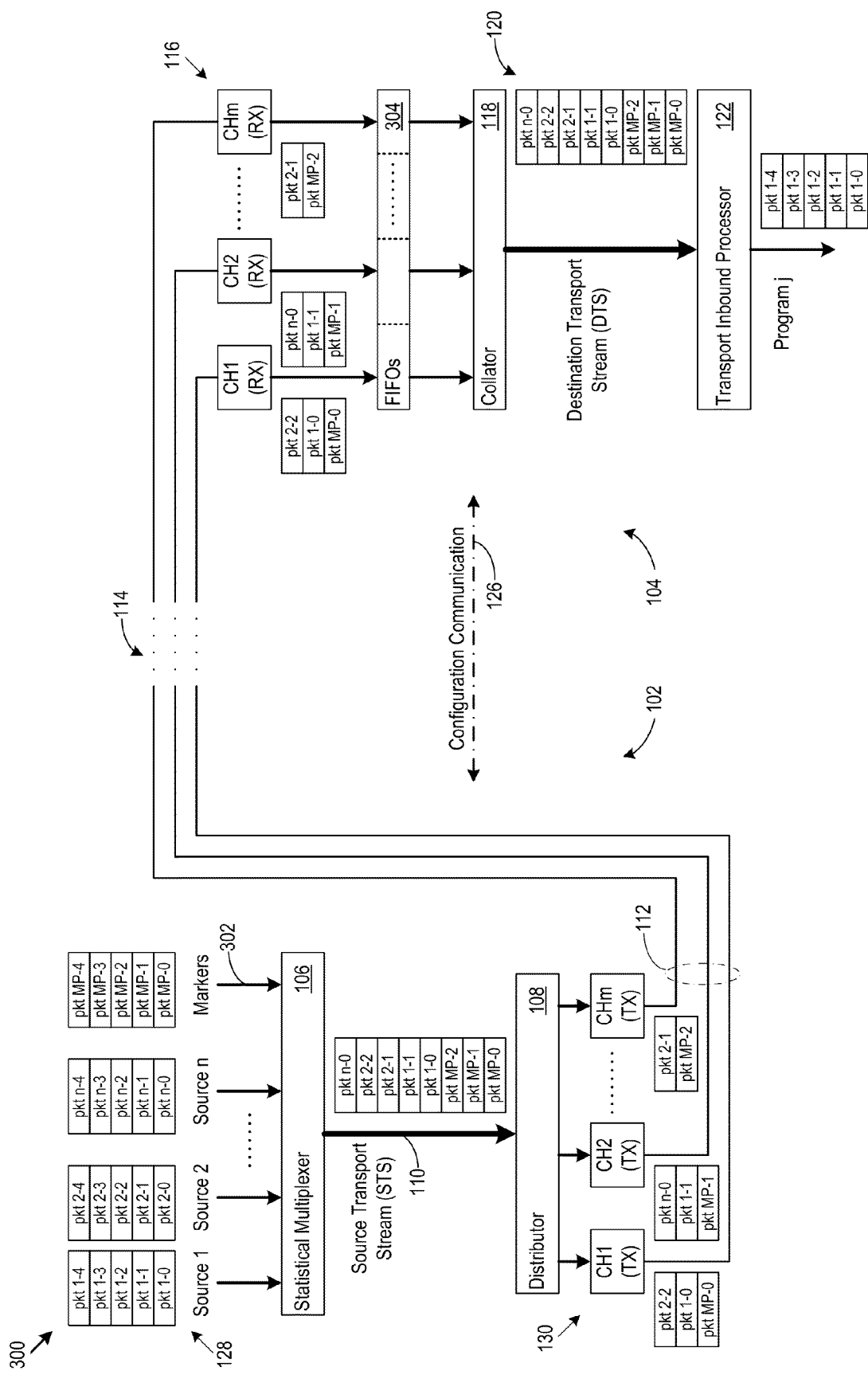
FIG. 3 shows an example of a content delivery architecture that employs channel bonding.

Regarding the first option, FIG. 3 shows another example of a content delivery architecture 300 that employs channel bonding. In the architecture 300, a marker packet (MP) source 302 feeds MPs to the statistical multiplexer 106. The MP source 302 may provide marker packets at any frequency. For example, the MP source 302 may provide a marker packet for each communication channel in the bonded channel group 112 for every 'n' non-marker packets received from the sources, every 'k' ms, or at some other time or packet spacing frequency. The time or packet spacing, 'n' or 'k' may take any desired value, e.g., from n=1 packet to tens of thousands of packets, or k=1 ms to 1 second. In other implementations, the distributor 108 generates the MPs, rather than receiving them in the STS 110.

Fewer marker packets consume less channel bandwidth, leaving more room for program data. However, more marker packets increase the ability of the destination 104 to adapt to changes in the program data, including allowing the collator 108 to more quickly synchronize the multiple data streams across the bonded channel group 112, allowing faster program channel changes through the TIP 122, and facilitating faster adaptation to changes in the configuration of the bonded channel group 112. Marker packet insertion may vary depending on any desired parameters. Examples of such parameters include available buffer sizes; target, average, or worst case recovery time for recovering from transmission errors or other transmission issues; target program channel change latency or other types of latency; and target program frame size.

In FIG. 3, the distributor 108 pushes packets to the modulators 130 on a round-robin basis, starting with any desired modulator 130. More specifically, the distributor 108 may communicate packets on a round-robin basis to each communication channel in the bonded channel group 112, one packet at a time. In other implementations described below, the round-robin distribution may be done n-packets at a time, where 'n' is greater than 1. However, for the example shown in FIG. 3, the distributor 108 pushes one packet at a time in a round-robin manner across the communication channels that compose the bonded channel group 112. Accordingly, given the example STS 110 packet stream of {MP-0, MP-1, MP-2, 1-0, 1-1, 2-1, 2-2, n-0}, the distributor 108 pushes:

MP-0 to channel 1, MP-1 to channel 2, MP-2 to channel 3; then pkt 1-0 to channel 1, pkt 1-1 to channel 2, pkt 2-1 to channel 3; then pkt 2-2 to channel 1, pkt n-0 to channel 2, and so on.

The MP source 302 may provide MPs to the statistical multiplexer 106 at a selected priority level, such as a highest available priority level, or a higher priority level than any other packets arriving from the program sources. Furthermore, the number of MPs in a set of MPs may match the number of communication channels in the bonded channel group 112. For example, when there are seven (7) communication channels in the bonded channel group 112, the MP source 302 may provide seven highest priority MPs to the statistical multiplexer 106. The statistical multiplexer 106 may then output the high priority MPs immediately next in the STS 110, so that the group of seven MPs arrive in sequence at the distributor 108. As a result of the packet-by-packet round-robin distribution, one of each of the seven marker packets correctly is pushed to one of the seven communication channels in the bonded channel group 112 to flag a stream of program packets that follow each MP.

The statistical multiplexer 106 or the distributor 108 or the MP source 302 may give the MPs a special identifier, such as a unique PID (e.g., MARKER_PID) that flags the MPs as marker packets. Any other desired content may be present in the MPs. As examples, the MPs may include a channel number and group number. The channel number may identify the communication channel that sent that MP (e.g., channel 0, 1, or 2 for a bonded channel group 112 of three communication channels). The channel number provides a type of sequence number that identifies, the first, second, third, and so on, communication channel in sequence to which the distributor 108 has sent program packets. The channel number, in other words, identifies a bonded channel sequence of distribution of program packets to the communication channels in the bonded channel group.

The group number may identify which set of MPs any particular MP belongs to, and the source 102 may increment the group number with each new set of MPs (e.g., every three MPs when there are three communication channels in the bonded channel group 112). The group number may also facilitate packet alignment, when, for example, jitter or skew is larger than the gap between inserted packets.

Note that the distributor 108 need not have any special knowledge of the MPs. Instead, the distributor 108 may push packets on a round-robin basis to the communication channels, without knowing or understanding what types of packets it is sending. However, in other implementations, the distributor 108 may in fact analyze and manipulate the packets that it distributes, to insert or modify fields in the MPS, for example. Additionally, the distributor 108 may generate the MPs, rather than receiving them in the STS 110.

The destination 104 processes the marker packets, and may align packets in a fixed order from the demodulators 116 to form the DTS 120. The destination 104 may include First In First Out (FIFO) buffers 304, or other types of memory, to counter jitter/skew on the communication channels, and the resultant mis-alignment in reception of packets across the various communication channels. The FIFOs 304 may be part of the collator 118 or may be implemented separately. A FIFO may be provided for each communication channel, to provide a set of parallel buffers on the receive side, for example.

At the destination 104, the collator 118 may drop all packets before a MP from each channel is received. The collator 118 checks the group number of the marker packet in each channel, and drops packets until the collator 118 has found marker packets with matching group numbers on each communication channel. When the group numbers do not match, this may be an indicator to the collator 118 that the skew is larger than the gap between marker packets.

The channel number in the marker packets specifies the sequence of communication channels from which the collator 118 will obtain packets. The collator 118 obtains packets in a round-robin manner that matches the round-robin distribution at the source 102. In an example with three communication channels in the bonded channel group 112, the collator 118 may start by obtaining a packet from the communication channel carrying MP sequence number zero, then moving to the communication channel carrying MP sequence number one and obtaining a packet, then moving to the communication channel carrying MP sequence number two and obtaining a packet, then back to the sequence number zero communication channel in a round-robin manner. The collator 118 thereby produces a DTS 120 that corresponds to the STS 110. The TIP 122 may then extract the selected program from the DTS 120.

Figure 4:
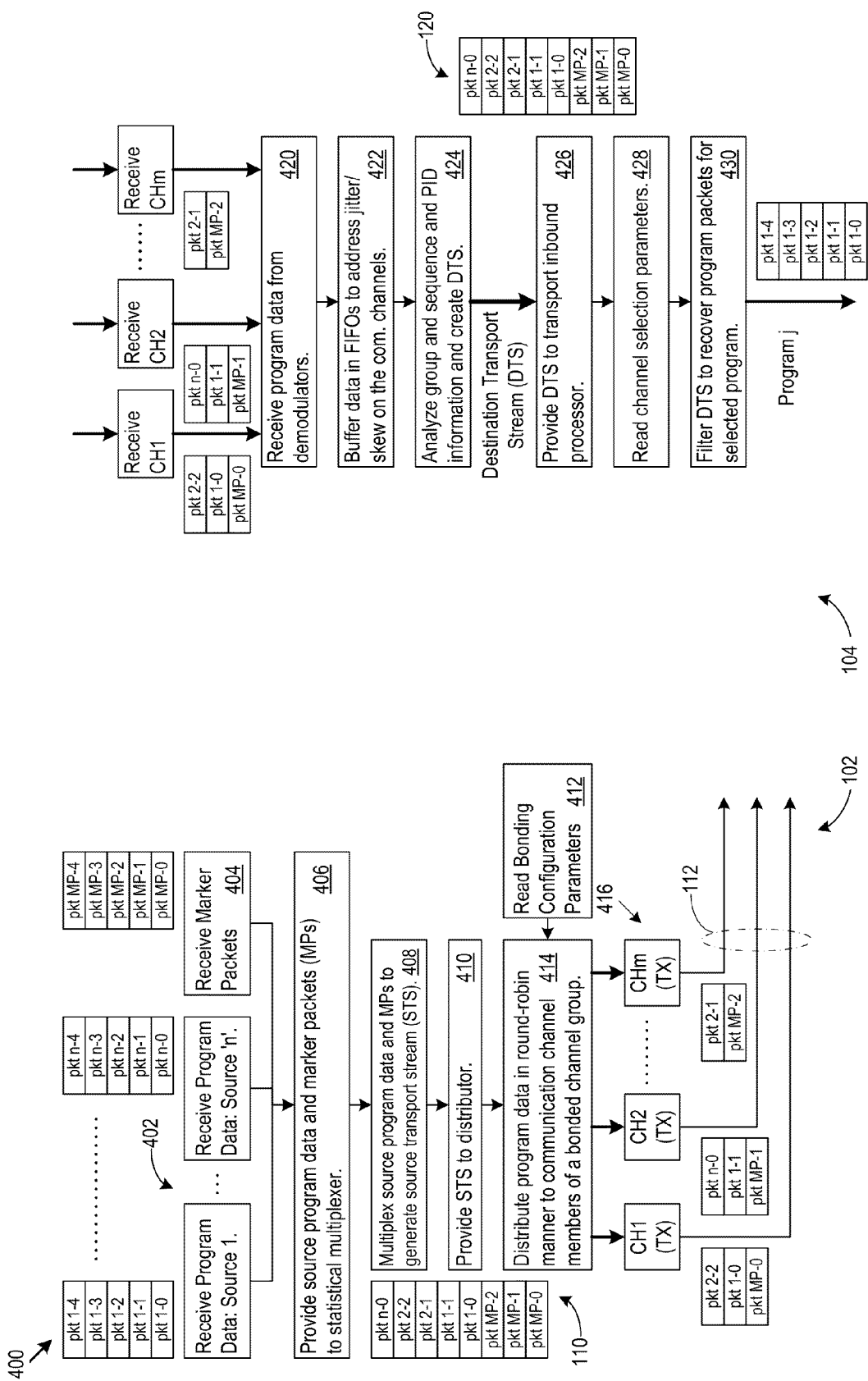
FIG. 4 shows an example of logic for content delivery using channel bonding.

FIG. 4 shows an example of logic 400 for content delivery using channel bonding that may be implemented in hardware, software, or both in the example architecture 300 described above. Input sources receive program data (402), and in addition, a MP source 302 may provide MPs (404). The input sources and MP source provide the program data and the MPs to the statistical multiplexer 106 (406), which multiplexes the program data and MPs to generate the source transport stream (STS) 110 (408).

In particular, the MPs may have a high priority, so that the statistical multiplexer 106 inserts them into the STS 110 sequentially without gaps before other program data packets. The STS 110 is provided to the distributor 108 (410). The distributor 108 reads bonding configuration parameters (412). The bonding configuration parameters may specify that the distributor 108 should take the round-robin distribution approach, and may specify round-robin distribution parameters. Examples of such parameters include the round-robin distribution chunk size, e.g., 'r' packets at a time per communication channel (e.g., 'r'=1), in what situations the distributor 108 should execute the round-robin technique, or any other round-robin parameter. As noted above, the bonding configuration parameters may also specify the number of communication channels in the bonding channel group 112, the communication channels that may be included in the bonding channel group 112, the type of communication channels that may be included in the bonding channel group 112, the program sources eligible for bonding, when and for how long communication channels and program sources are available for channel bonding, and any other parameters that may influence how the distributor 108 pushes program data across the communication channels in the bonded channel group 112.

The distributor 108 pushes the program data to the communication channels in the bonded channel group 112 (414). The source 102 thereby communicates program data to the destination 104 across the multiple communication channels in the bonded channel group 112 (416).

More particularly, the distributor 108 may push the program packets to the communication channels in round-robin manner. In one implementation, the round-robin approach is a one packet at a time approach. In other words, the distributor 108 may take each packet (when 'r'=1) from the STS 110 and push it to the next communication channel in sequence. As such, the in-order sequence of MPs from the STS 110 is distributed one MP per communication channel, and is followed by one or more program packets. The MPs thereby effectively flag for the destination 104 the program packets that follow the MPs. After a predetermined number of program packets, the MP source provides another group of MPs that are then distributed across the communication channels, and the cycle repeats.

At the destination 104, the demodulators 116 receive the program data over the communication channels (420). The demodulators 116 provide the recovered program data to buffers (e.g., the FIFOs 304) to help address jitter/skew (422) on the communication channels. The buffered data is provided to the collator 118, which may pull packets from the buffers to synchronize on MPs. The collator 118 analyzes group information, sequence information, PIDs, and any other desired information obtained from the MPs and program packets to synchronize on MPs. The synchronization may include finding sequential MPs of the same group number across each communication channel in the bonded channel group 112. The collator 118 may then create a destination transport stream (DTS) 120 from the recovered program data (424) by adding packets to the DTS 120 in a round-robin manner across the communication channels in the bonded channel group 112, going in order specified by the channel numbers specified in the MPs. The DTS 120 may convey the program packets in the same sequence as the STS 110, for example.

The collator 118 provides the DTS 120 to the TIP 122 (426). The TIP 122 reads channel selection parameters (428). The channel selection parameters may specify, for example, which program is desired, and may be obtained from viewer input, from automated selection programs or processes (e.g., in a digital video recorder), or in other ways. Accordingly, the TIP 122 filters the DTS 120 to recover the program packets that match the channel selection parameters (e.g., by PID filtering) (430). The TIP 122 thereby generates a content output that includes an output packet stream for the selected program. The TIP 122 delivers the generated content to any desired device 124 that consumes the content, such as televisions, smart phones, personal computers, or any other device.

Figure 5:
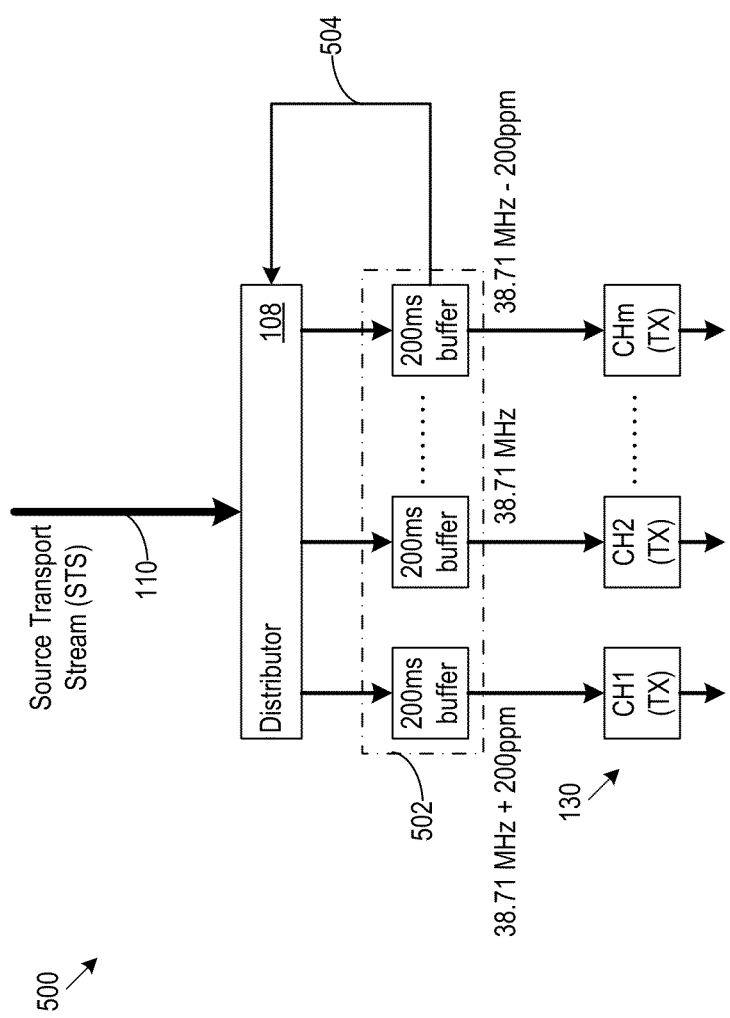
FIG. 5 shows a timing example.

FIG. 5 shows a timing example 500 which shows that in some implementations, the source 102 may address transmit clock variations in the modulators 130. FIG. 5 shows transmit buffers 502, each of which may provide some predetermined depth, such as a depth at least that of the channel timing variation (e.g., 200 ms). As one example, the communication channels may be expected to have the same nominal payload rates, e.g., 38.71 Mb/s. Further, assume that the transmit clock in each modulator is independent, and can vary by plus or minus 200 ppm.

Thus, in the worst case, two channels in a bonded channel group may have a clock difference of 400 ppm. As shown in the example in FIG. 5, the timing different from channel 1 to channel 2 is 200 ppm, and the timing difference between channel 1 and channel 'm' is 400 ppm. The timing difference of 400 ppm may amount to as much as one 188 byte MPEG2 TS packet every 2500 outgoing packets.

Accordingly, the source 102 may insert a compensation packet (which may have NULL content) on channel 'm' every 2500 packets to cover the extra outgoing packet, and also insert a compensation packet on channel 2 every 5000 packets for the same reason. The compensation packet may appear, for example, just prior to the MP, or anywhere else in the outgoing data stream. The destination 104 may identify and discard compensation packets (or any other type of jitter/skew compensation packet).

The source 102 may implement a buffer feedback 504. The buffer feedback 504 informs the distributor 108 about buffer depths in the transmit buffers 502. When the buffers run empty, or at other times, the distributor 108 may insert compensation packets, e.g., before MPs.

Figure 6:
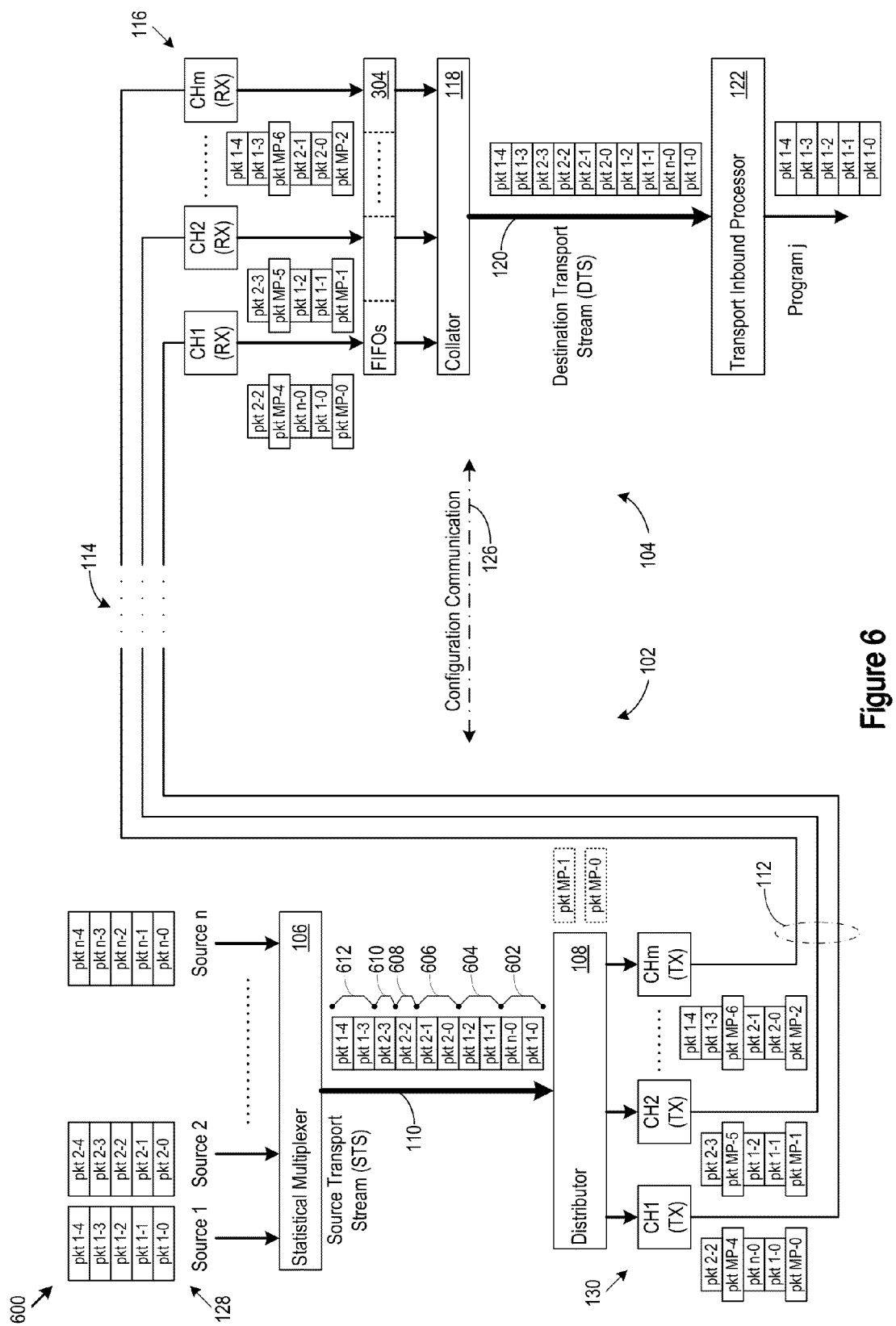
FIG. 6 shows an example of a content delivery architecture that employs channel bonding.

FIG. 6 shows another example of a content delivery architecture 600 that employs channel bonding. In this second option, the architecture 600 includes a distributor 108 that sends data over the communication channels in communication units called chunks (but any other term may refer to the communication units). The chunks may include one or more packets from any of the program sources. For example, a chunk may be 1 packet, 10 packets, 100 packets, 27 packets, 10,000 packets, 100 ms of packets, 20 ms of packets, 30 ms of video data, 5 s of audio data, or any other number or timing of packets or audio/visual content.

The distributor 108 may use the same or different chunk size for any of the communication channels. Furthermore, the distributor 108 may change the chunk size at any time, in response to an analysis of any desired chunk size criteria. One example of a chunk size criteria is desired channel change speed at the destination 104. As the number of packets in a chunk increases, the destination 104 may need to drop more packets before reaching the next chunk boundary, finding the matching MPs, and being able to synchronize to the received communication channels. The chunk size may also depend on compressed video rate or frame size, as well as target, average, or worst case recovery time for recovering from transmission errors or other transmission issues.

In the example in FIG. 6, the statistical multiplexer 106 receives program packets from input sources 1 . . . 'n'. The program packets may be MPEG2 TS packets, or any other type of packet. The statistical multiplexer 106 creates a STS 110 from the program packets, and the STS 110 therefore has a particular sequence of packets multiplexed into the STS 110 from the various input sources according to the statistical properties of the program streams.

For the purposes of illustration, FIG. 6 shows the first six chunks that the distributor 108 has decided to send over the communication channels. In particular, the first three chunks are two-packet chunks 602, 604, and 606. The next two chunks are one-packet chunks 608 and 610. The next chunk is a two-packet chunk 612.

The distributor 108 generates MPs that precede the chunks. Alternatives are possible, however, and some are described below with respect to FIGS. 15 and 16. The distributor 108 may communicate the MPs and the chunks (e.g., in a round-robin manner) across the communication channels. In the example of FIG. 6, the distributor 108 sends a MP (e.g., MP-0, MP-1, and MP-2) to each communication channel, followed by a two-packet chunk behind MP-0, MP-1, and MP-2, in round-robin sequence: channel 1, channel 2, channel m, and then returning to channel 1. The distributor 108 may start the sequence with any particular communication channel.

As is shown in FIG. 6, the communication channels receive MPs and chunks in round-robin manner starting with channel 1 as follows:

Channel 1: MP-0; Channel 2: MP-1; Channel 3: MP-2

Channel 1: chunk 602; Channel 2: chunk 604; Channel 3: chunk 606

Channel 1: MP-4; Channel 2: MP-5; Channel 3: MP-6

Channel 1: chunk 608; Channel 2: chunk 610; Channel 3: chunk 612

Because chunk boundaries are marked with MPs, the distributor 108 may insert compensation packets (e.g., NULL packets) without affecting the channel bonding. In other words, each communication channel may have its own unique payload rate. Furthermore, MPEG2 TS corruption during transmission does not affect other packets.

Each MP may include a channel number and a group number, as described above. The channel and group numbers may take a wide variety of forms, and in general provide sequence indicators. Take the example where the chunk size is 100 packets and there are three communication channels A, B, and C, with the distributor 108 proceeding in this order: C, B, A, C, B, A, . . . . The first set of MPs that come before the first 100 packet chunks may each specify group number zero. Within group zero, the first MP on communication channel C has a channel number of zero, the second MP on communication channel B has a channel number of one, and the third MP on the communication channel A has a channel number of two. For the next group of chunks of 100 packets, the MP group number for the next three MPs may increment to one, and the channel numbers run from zero to two again.

At the destination 104, the demodulators 116 receive the MPs and chunks from each communication channel. Again, individual FIFOs 204 may be provided to help compensate for jitter and skew.

The collator 118 receives the MPs, and synchronizes on the received data streams when the collator 118 finds MPs of the same group number and in sequence across the communication channels that are part of the bonded channel group 112. Once the collator 118 has synchronized, it obtains each chunk following the MPs in order of group number and channel number. In this manner, the collator 118 constructs the DTS 120 that corresponds to the STS 110. As described above, the TIP 122 executes PID filtering on the MPEG2 TS packets to recover any desired program j, and may discard the other packets.

Figure 7:
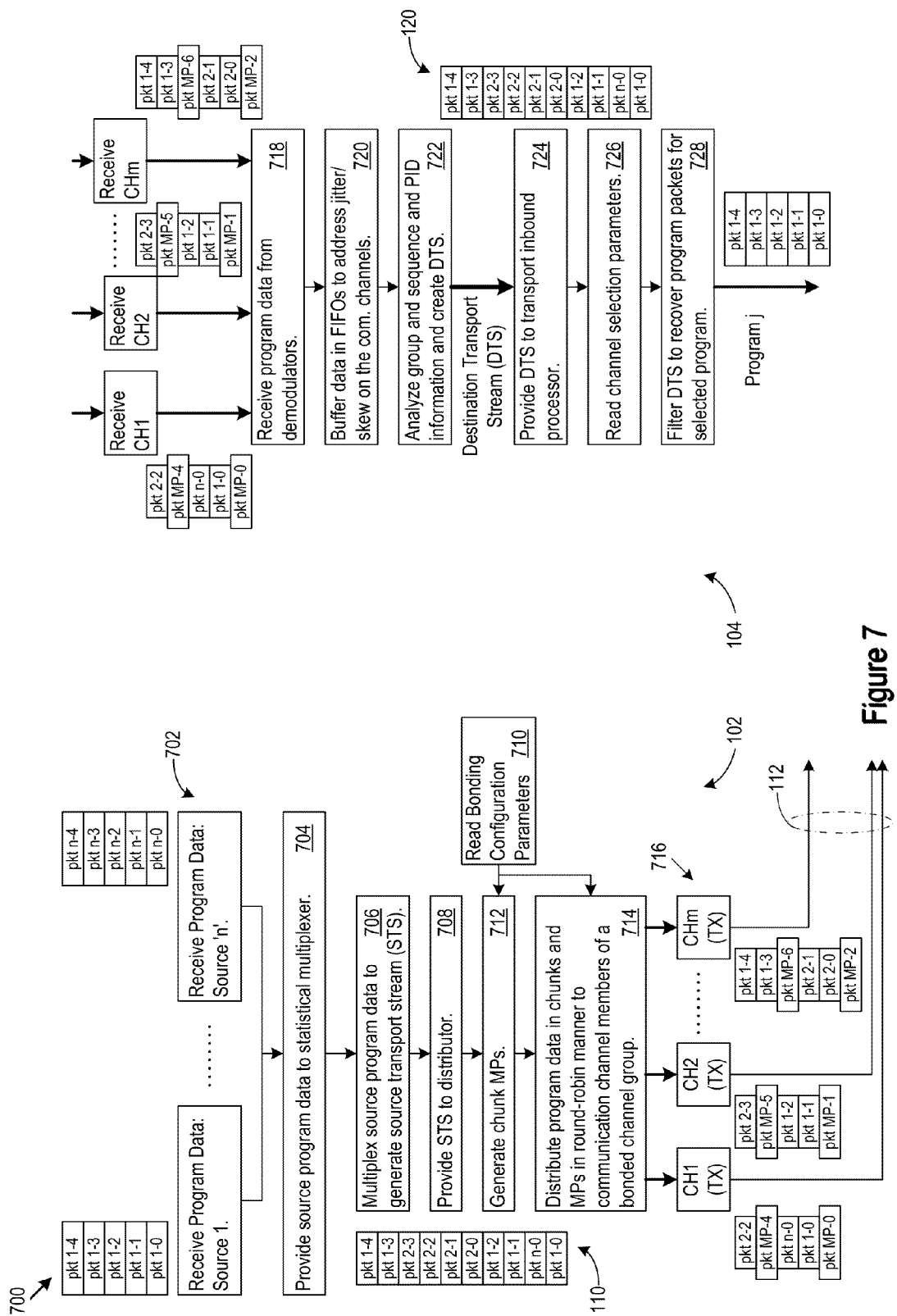
FIG. 7 shows an example of logic for content delivery using channel bonding.

FIG. 7 shows an example of logic 700 for content delivery using channel bonding, that may be implemented in hardware or software in the example architecture 600 described above. Input sources receive program data (702). The input sources provide the program data to the statistical multiplexer 106 (704), which multiplexes the program data to generate the source transport stream (STS) 110 (706). The distributor 108 receives the STS 110 (708).

The distributor 108 also reads bonding configuration parameters (710). The bonding configuration parameters may, for example, specify that the distributor 108 should take the round-robin distribution approach, and may specify round-robin distribution parameters. Examples of such parameters include the round-robin distribution chunk size, e.g., 'r' packets at a time per communication channel (e.g., r=100), chunk size per communication channel, or chunk size variation in time, or variation depending on chunk size factors that the source 102 may monitor and adapt to over time, in what situations the distributor 108 should execute the round-robin technique, or any other round-robin parameter. As noted above, the bonding configuration parameters may also specify the number of communication channels in the bonding channel group 112, the communication channels that may be included in the bonding channel group 112, the type of communication channels that may be included in the bonding channel group 112, the program sources eligible for bonding, when and for how long communication channels and program sources are available for channel bonding, and any other parameters that may influence how the distributor 108 pushes program data across the communication channels in the bonded channel group 112.

In this option, the distributor generates MPs (712) for the chunks of program packets that the distributor sends through the individual communication channels in the bonded channel group 112. Thus, for example, when the bonding configuration parameters indicate a chunk size of 100 packets, the distributor generates a MP for each 100 program packets communicated down the communication channel. As was explained above, a MP may include synchronization data, such as a group number and channel number. As another example, the MP may include timing data such as a timestamp, time code, or other timing reference measurement.

The distributor 108 sends the MPs and the program data to the communication channels in the bonded channel group 112 (714). The distributor 108 may send the MPs and program data in a round-robin manner by communication units of program packets (e.g., by chunks of program packets). The source 102 thereby communicates program data to the destination 104 across the multiple communication channels in the bonded channel group 112 (716).

More particularly, the distributor 108 may send the program packets to the communication channels in round-robin manner by chunk. In other words, the distributor 108 may take chunks of program packets from the STS 110 and send them to the next communication channel in the bonded channel group 112 in a predetermined round-robin sequence (e.g., as specified in the bonding configuration parameters). As such, an MP is distributed to a communication channel, and is followed by a chunk of program packets tagged by the MP in terms of group number and channel number. The program packets include PID information that identifies the program to which each packet belongs. The MPs thereby effectively flag for the destination 104 the program packets that follow the MPs. After each chunk of program packets, the distributor 108 provides another group of MPs that are then distributed across the communication channels, and the cycle repeats. The chunk size may vary in time and by communication channel. Furthermore, the source 102 may send configuration communications to the destination 104 to advise the destination 104 of the bonding configuration and changes to the bonding configuration, including chunk size.

At the destination 104, the demodulators 116 receive the program data over the communication channels (718). The demodulators 116 provide the recovered program data to buffers (e.g., the FIFOs 304) to help address jitter/skew (720) on the communication channels. The buffered data is provided to the collator 118, which may pull packets from the buffers to synchronize on MPs. The collator 118 analyzes group information, sequence information, PIDs, and any other desired information obtained from the MPs and program packets to synchronize on MPs. The synchronization may include finding sequential MPs of the same group number across each communication channel in the bonded channel group 112.

The collator 118 then creates a destination transport stream (DTS) 120 from the recovered program data (722) by adding packets to the DTS 120 in a round-robin manner across the communication channels in the bonded channel group 112. In particular, the collator 118 adds packets to the DTS 120 by chunk of program packets in a round-robin manner across the communication channels in the bonded channel group 112. Thus, the DTS 120 may convey the program packets to the TIP 122 in the same sequence as they were present in the STS 110, for example.

The collator 118 provides the DTS 120 to the TIP 122 (724), which reads channel selection parameters (726). The channel selection parameters may specify, for example, which program is desired, and may be obtained from viewer input, from automated selection programs or processes (e.g., in a smart phone content recording application), or in other ways. Accordingly, the TIP 122 filters the DTS 120 to recover the program packets that match the channel selection parameters (e.g., by PID filtering) (728). The TIP 122 thereby generates a content output that includes an output packet stream for the selected program. The TIP 122 delivers the generated content to any desired device 124 that consumes the content, such as televisions, smart phones, personal computers, or any other device.

Figure 15:
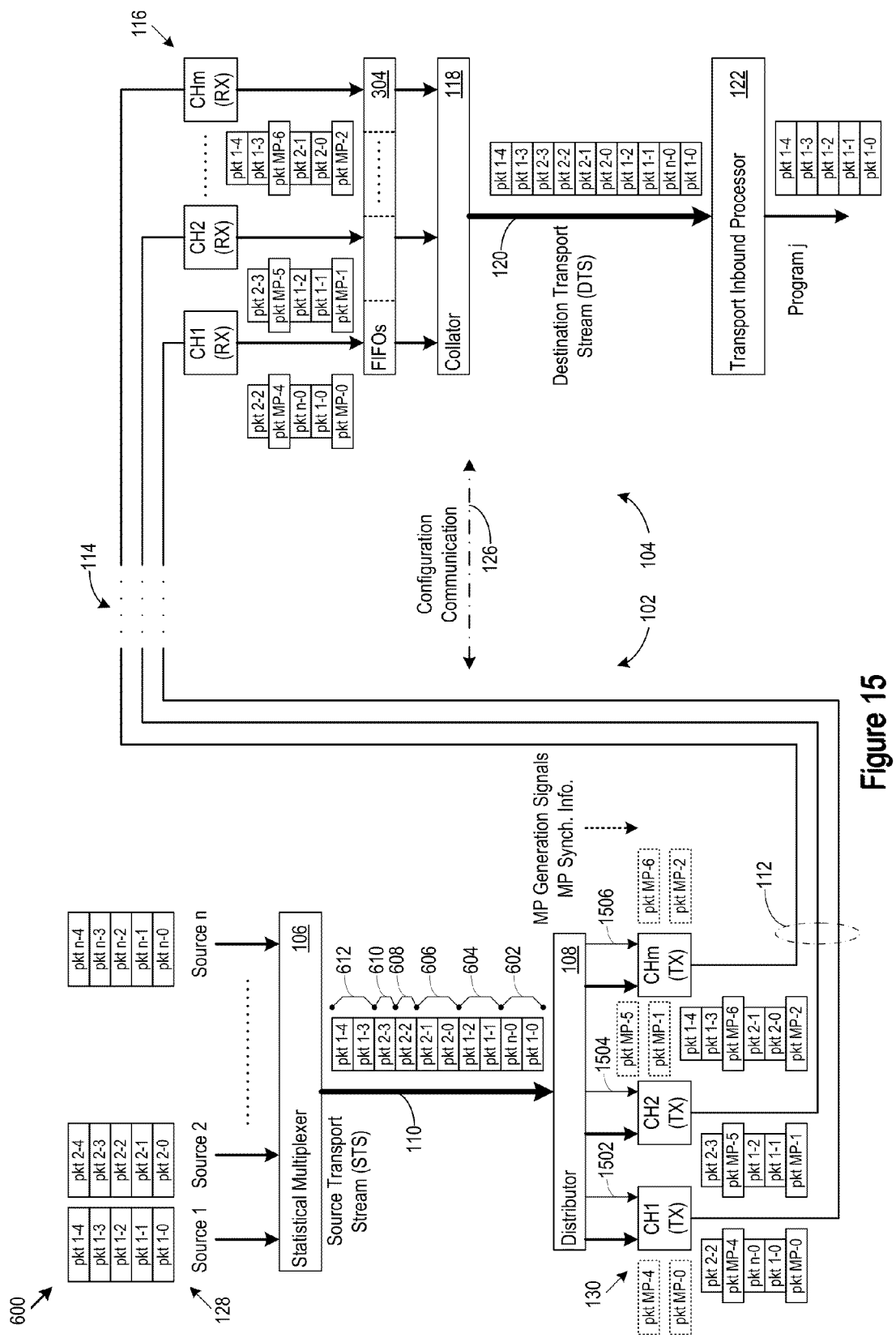
FIG. 15 shows an example variant of the content delivery architecture of FIG. 6.

Turning briefly to FIG. 15, that figure shows an example variation architecture 1500 of the content delivery architecture 600 in FIG. 6. In one variation, the distributor may instead issue MP generation signals (e.g., the MP generation signals 1502, 1504, 1506) to the modulators 130. The MP generation signal 1502 may be a command message, signal line, or other input that causes the receiving modulator to generate a MP for insertion into the packet stream, e.g., at chunk boundaries. The MP may include any desired synchronization information, including time stamps, time codes, group numbers, channel numbers, and the like. The modulator may generate the synchronization information, or the distributor 108 may provide the synchronization information to the modulator along with the MP generation signal.

In another variation, both the distributor 108 generates MPs and the modulators 130 generate MPs. For example, the distributor 108 may generate the MPs for the modulator for CH2 and send MP generation signals to the modulators for the other channels. Another alternative is for the distributor 108 to generate MPs for some modulators some of the time, and to send MP generation signals to those modulators at other times. Whether or not the distributor 108 generates the MPs may depend on MP capability information available to the distributor 108. For example, the bonding configuration parameters 710 may specify which modulators are capable of generating MPs, when, and under what conditions. Then, the distributor 108 may send the MP generation signal to those modulators at the corresponding times or under the corresponding conditions. Further, the modulator may communicate with the distributor 108 to specify MP generation capabilities, and the conditions on those capabilities, such as when and under what conditions the modulator can generate MPs, and also what information the modulator needs from the distributor 108 to generate the MPs.

Figure 16:
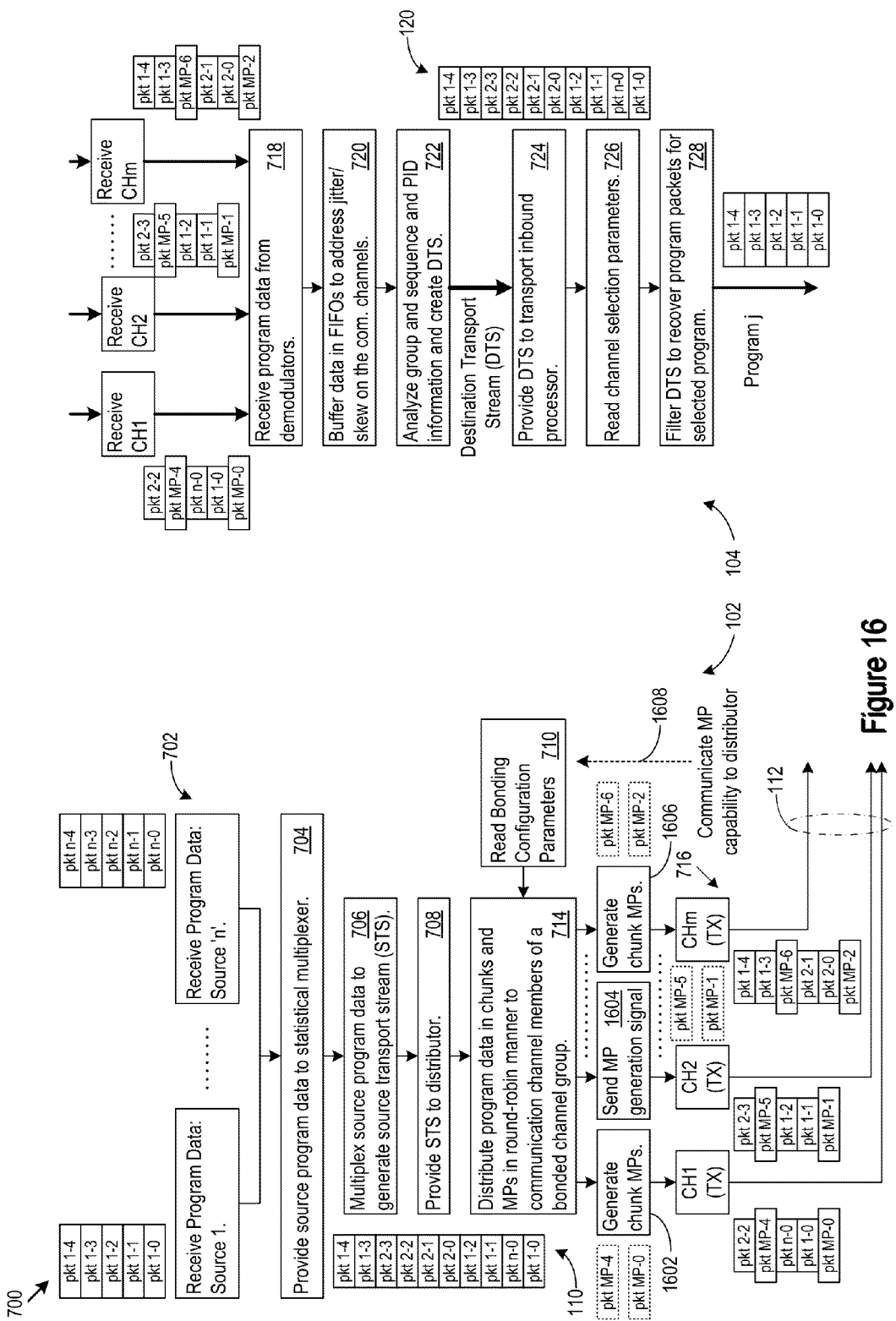
FIG. 16 shows an example variant of the content delivery architecture of FIG. 7.

Turning briefly to FIG. 16, that figure shows content delivery logic 1600 for the architectures described above. FIG. 16 shows again that, in the architectures described above (e.g., 1500 and 600), the distributor 108 may generate MPs, the modulators 130 may generate MPs, or both may generate MPs. For example, FIG. 16 shows that for the modulator for CH1, the distributor 108 generates the MPs (1602), e.g., at chunk boundaries. The distributor 108 also generates the MPs for the modulator for CHm (1606). However, for the modulator for CH2, the distributor 108 sends an MP generation signal and any desired synchronization information (1604) to the modulator for CH2. Accordingly, the modulator for CH2 generates its own MPs for the chunks it receives from the distributor 108. Note also that any modulator may communicate with the distributor 108 to specify MP generation capabilities, and the conditions on those capabilities, including when and under what conditions the modulator can generate MPs, as well as what information the modulator needs from the distributor 108 to generate the MPs (1608).

Figure 8:
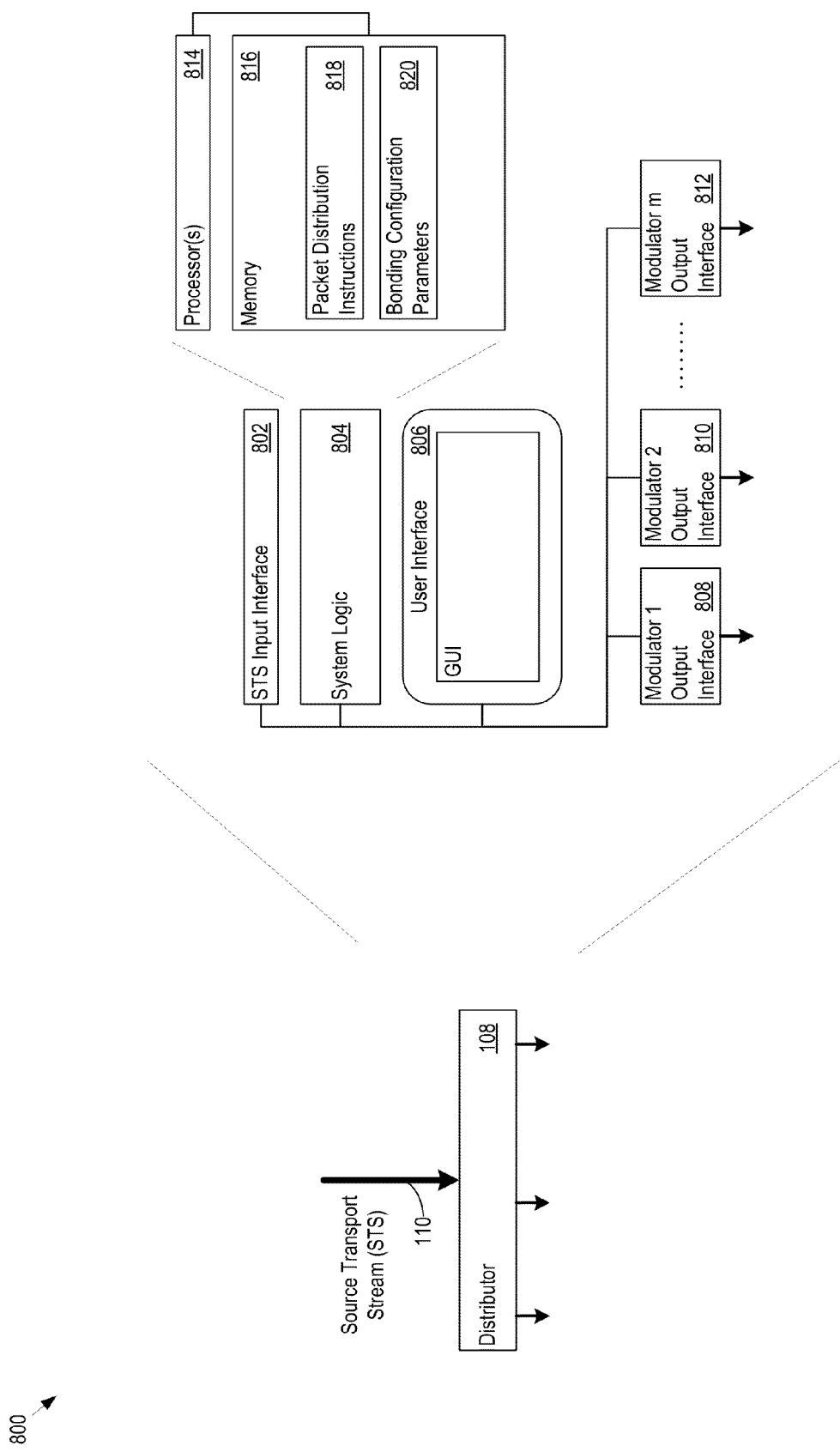
FIG. 8 shows an example implementation of a distributor.

Turning now to FIG. 8, the figure shows an example implementation of a distributor 800. The distributor 108 includes an STS input interface 802, system logic 804, and a user interface 806. In addition, the distributor 800 includes modulator output interfaces, such as those labeled 808, 810, and 812. The STS input interface 802 may be a high bandwidth (e.g., optical fiber) input interface, for example. The modulator output interfaces 808-812 feed data to the modulators that drive data over the communication channels. The modulator output interfaces 808-812 may be serial or parallel bus interfaces, as examples.

The system logic 804 implements in hardware, software, or both, any of the logic described in connection with the operation of the distributor 108 (e.g., with respect to FIGS. 1-7 and 10). As one example, the system logic 804 may include one or more processors 814 and program and data memories 816. The program and data memories 816 hold, for example, packet distribution instructions 818 and the bonding configuration parameters 820.

The processors 814 execute the packet distribution instructions 818, and the bonding configuration parameters 820 inform the processor as to the type of channel bonding the processors 814 will perform. As a result, the processors 814 may implement the round-robin packet by packet distribution or round-robin chunk by chunk distribution described above, including MP generation, or any other channel bonding distribution pattern. The distributor 800 may accept input from the user interface 806 to change, view, add, or delete any of the bonding configuration parameters 820 or any channel bonding status information.

Figure 9:
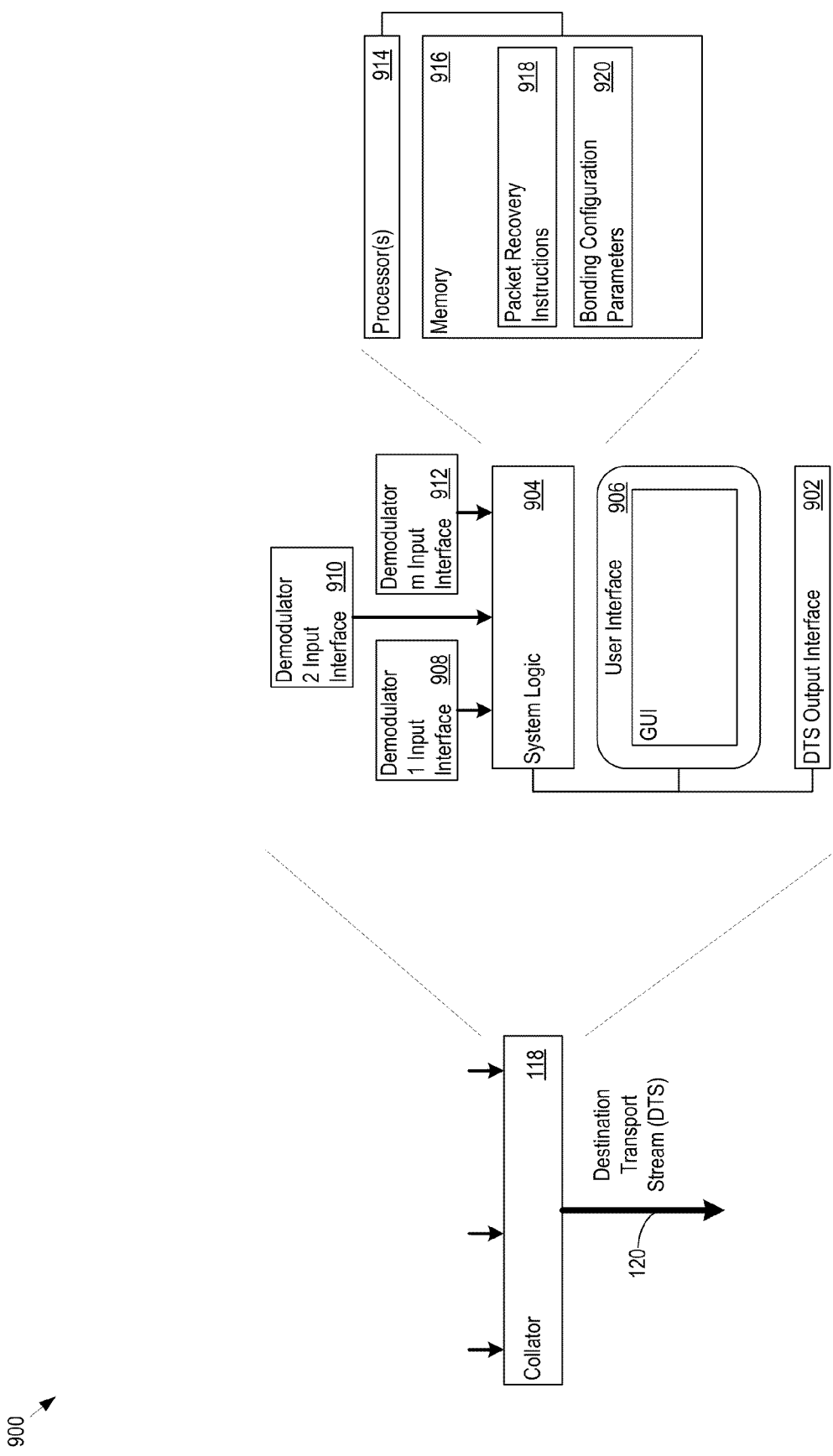
FIG. 9 shows an example implementation of a collator.

FIG. 9 shows an example implementation of a collator 900. The distributor 108 includes a DTS output interface 902, system logic 904, and a user interface 906. In addition, the collator 900 includes demodulator input interfaces, such as those labeled 908, 910, and 912. The DTS output interface 902 may be a high bandwidth (e.g., optical fiber) output interface to the TIP 122, for example. The demodulator output interfaces 908-912 feed data to the collator system logic which will create the DTS 120 from the data received from the demodulator input interfaces 908-912. The demodulator input interfaces 908-912 may be serial or parallel bus interfaces, as examples.

The system logic 904 implements in hardware, software, or both, any of the logic described in connection with the operation of the collator 118 (e.g., with respect to FIGS. 1-7 and 10). As one example, the system logic 904 may include one or more processors 914 and program and data memories 916. The program and data memories 916 hold, for example, packet recovery instructions 918 and the bonding configuration parameters 920.

The processors 914 execute the packet recovery instructions 918, and the bonding configuration parameters 920 inform the processor as to the type of channel bonding the processors 914 will handle. As a result, the processors 914 may implement the round-robin packet by packet reception or round-robin chunk by chunk reception described above, including MP synchronization, or any other channel bonding distribution recovery logic. The collator 900 may accept input from the user interface 906 to change, view, add, or delete any of the bonding configuration parameters 920, to specify which channels are eligible for channel bonding, or to set, view, or change any other channel bonding status information.

The architectures described above may also include network nodes between the source 102 and the destination 104. The network nodes may be type of packet switch, router, hub, or other data traffic handling logic. The network nodes may be aware of the communication channels that they are connected to, both on the inbound side, and on the outbound side. Accordingly, a network node may receive any particular set of communication channels in a channel bonding group, but need not have a matching set of communication channels in the outbound direction. In that case, the network node may filter the received communication channel traffic, to drop packets for which the network node does not have a corresponding outbound communication channel, while passing on the remaining traffic flow over the outbound communication channels to which it does have a connection.

In concert with the above, the channel bonding may happen in a broadcast, multicast, or even a unicast environment. In the broadcast environment, the source 102 may send the program packets and MPs to every endpoint attached to the communication channels, such as in a wide distribution home cable service. In a multicast environment, however, the source 102 may deliver the program packets and MPs to a specific group of endpoints connected to the communication channels. In this regard, the source 102 may include addressing information, such as Internet Protocol (IP) addresses or Ethernet addresses, in the packets to specifically identify the intended recipients. In the unicast environment, the source 102 may use addressing information to send the program packets and the MPs across the bonded channel group 112 to a single destination.

A third option is to add, at the source 102, channel bonding data fields to the program packets. The channel bonding data fields may be added to the packet header, payload, or both. The channel bonding data fields may identify for the destination 104 how to order received packets to create the DTS 120. In that regard, the channel bonding data fields may include PID information, sequence information, channel number information, group number information, or other data that the collator 118 may analyze to determine packet output order in the DTS 120.

In some implementations, a communication head-end may define the program packets that each source will employ, and therefore has the flexibility to create channel bonding fields in the program packets. In other implementations, the source 102 inserts channel bonding data into existing packet definitions (possibly using part of a conventional data field for this new purpose). For example, in some implementations, each program is formed from multiple MPEG2 PIDs, with each MPEG2 TS packet being 188 bytes in size. When packets from the same program will be routed across different communication channels, the source 102 may use header or payload fields in the MPEG2 TS packets to carry channel bonding fields (e.g., PID and sequence number) in the MPEG2 TS packets.

As one example, the source 102 may add, as channel bonding data, a program ID (PID) and sequence number to program packets. The PID may be a O-bit field that identifies one of 16 different programs. The sequence number may be a 12-bit field that identifies one of 4096 sequence values. In this implementation, the source 102 need not send MPs. Instead, the channel bonding information (e.g., PID and sequence number) inserted into the program packets provides the destination 104 with the information it uses to construct the DTS 120. More specially, the collator 118 identifies the PIDs and the packets with sequential sequence numbers for each PID, and creates the DTS 120 with the correct packet sequence.

Furthermore, the source 102 may also insert the channel bonding data into lower layer packets. For example, instead of (or in addition to for redundancy), sending MPs defined at or above the transport layer, the source 102 may instead insert the channel bonding data into frames defined below the transport layer, such as data-link layer frames or physical layer frames. As an example, the data-link layer frames may be Low Density Parity Check (LDPC) frames, and the physical layer frames may be Forward Error Correcting (FEC) frames.

Because such frames are defined at the data-link layer, higher layers may have no knowledge of these frames or their formats, and generally do not process such frames. Nevertheless, the higher level layers, including the transport layer, may provide bonding information to the data-link layer that facilitates data-link layer handling of the channel bonding data. Examples of such bonding information includes the amount and type of channel bonding data desired, including the definitions, sizes, and sequence numbering of channel number and sequence number fields, desired chunk size, number, identification and type of communication channels to bond, or any other channel bonding information.

In more detail, in some communication architectures, the data-link layer packets have spare, reserved, or otherwise ancillary bits. Instead of having the ancillary bit fields remain unused, the system 102 may insert the channel bonding data in those ancillary bit fields. In other implementations, the data-link layer may define its own particular packet format that includes bit fields specifically allocated for channel bonding data.

Figure 10:
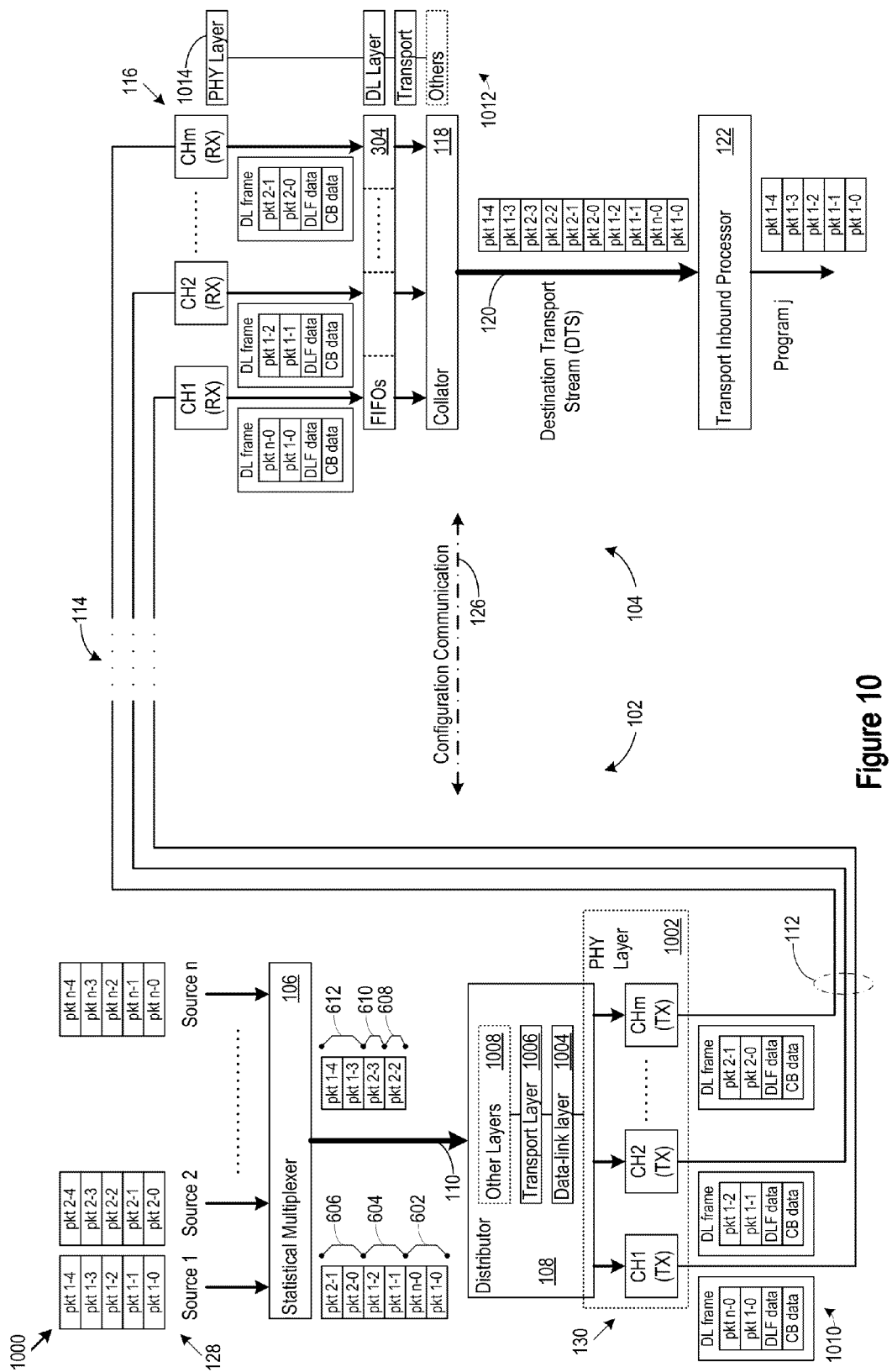
FIG. 10 shows an example of a content delivery architecture that performs channel bonding below the transport layer, e.g., at the data-link layer.

FIG. 10 shows an example of a content delivery architecture 1000 that performs channel bonding below the transport layer, e.g., at the data-link layer or physical layer. FIG. 10 extends the example of FIG. 6 for the purposes of discussion, but channel bonding at lower layers may occur in any content delivery architecture. In FIG. 10, a protocol stack at the distributor 108 includes multiple layers, including a Physical (PHY) layer 1002, a data-link layer 1004, a transport layer 1006, and any other layers desired 1008. The protocol stack may adhere to the Open Systems Interconnection (OSI) model, as one example, and the data-link layer and physical layer structures that may carry channel bonding information may include, as examples, Forward Error Correcting (FEC) frames, PHY frames, MAC frames, Low Density Parity Check (LDPC) frames, or IP Datagram frames. However any other protocol stack and structure types may instead be in place to handle channel bonding at a level below the level at which the program packets.

The STS 110 provides the program packets to the distributor 108. The protocol stack handles the program packets. In particular, the data-link layer 1004 constructs low level frames that encapsulate program packets and channel bonding data, and that are sent across the communication channels in the bonded channel group 112. One example of the low level frames is the data-link frame 1010. In this example, the data-link frame 1010 includes channel bonding (CB) data, data-link frame (DLF) data, and program packets (in particular, the first chunk 602). The DLF data may include the information fields in an already defined data-link layer packet format. The CB data may include channel number and group number information, or any other information that a MP might otherwise carry.

Higher level layers may (e.g., the transport layer 1006 or other layers 1008), as noted above, provide guidance to the data-link layer 1004 regarding what bonding information to include in the data-link layer frames. However, this is not required. The data-link layer may do its own analysis and makes its own decisions concerning what channel bonding data to add into the data-link layer frames. In that regard, the data-link layer may read the channel bonding configuration parameters. The data-link layer may also exchange the configuration communications 126 with the destination 104, including configuration communications 126 with the data-link layer, transport layer, or other layers at the destination 104.

At the destination 104, a protocol stack 1012 processes the data received from the demodulators 116. In particular, the protocol stack 1012 may include a data-link layer 1014. The data-link layer 1014 receives the data-link layer frames (e.g., the frame 1010) to extract the program packets and channel bonding data. The collator 118 may then process the channel bonding data as described above to synchronize the communication channels in the bonded channel group 112 and build the DTS 120.

Figure 11:
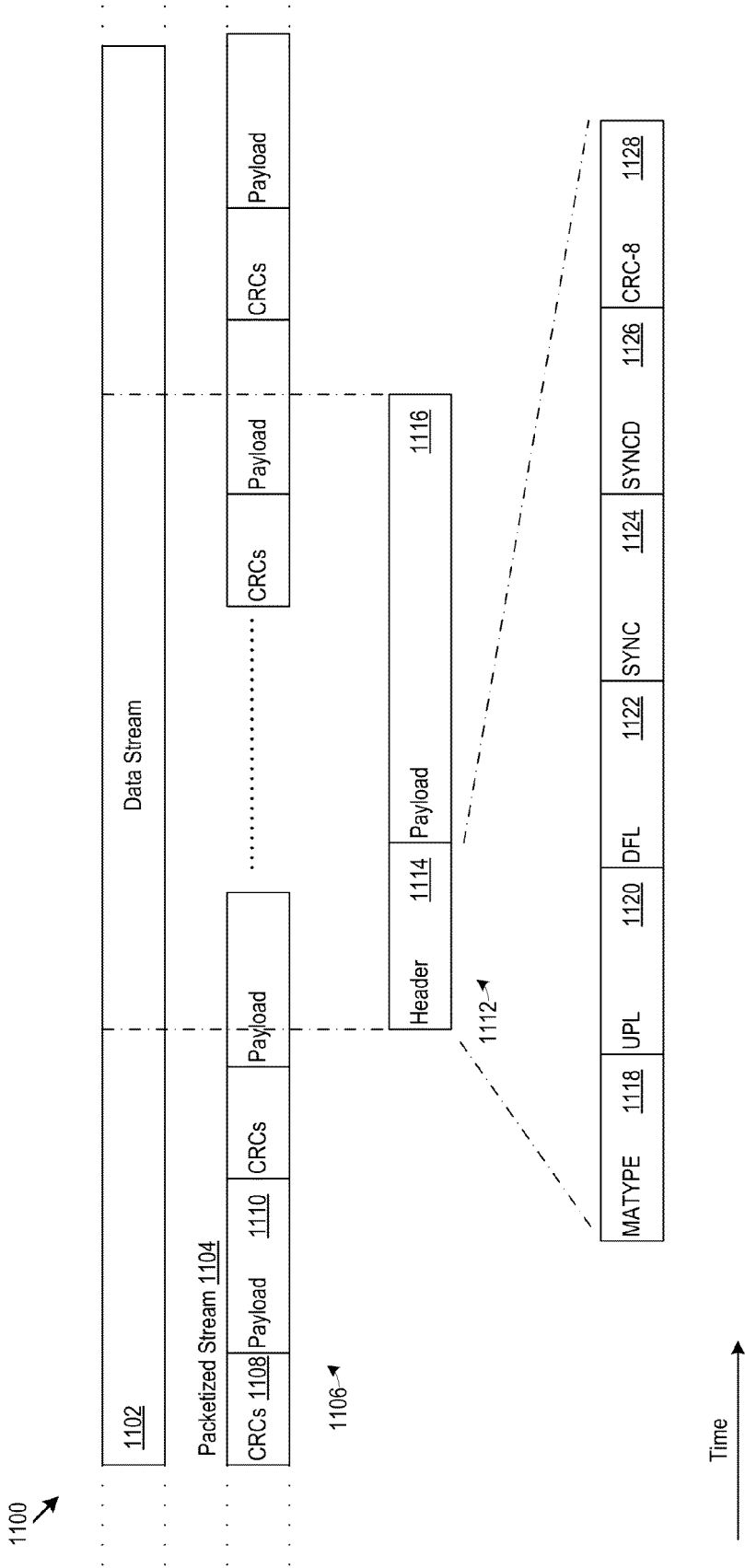
FIG. 11 shows an example of channel bonding at the data-link layer.

FIG. 11 shows an example of channel bonding using data-link layer frames 1100. In FIG. 11, a data stream 1102 represents, for example, source data prior to packetization. The data stream 1102 may be as examples, data generated by a video camera, microphone, or bytes in a file on a disk drive. A content provider generates a packetized stream 1104, for example in the form of MPEG2 TS packets 1106. The packets 1106 may take many different forms, and in the example shown in FIG. 11, the packets 1106 include Cyclic Redundancy Check (CRC) data 1108 (e.g., in a header), and a payload 1110.

FIG. 11 also shows the data-link layer frames 1112. In this example, the data-link layer frames 1112 include a header 1114 and a payload 1116. The header 1114 may include fields in which, although they are pre-defined for other purposes, the data-link layer 1004 inserts channel bonding data, such as channel number and group number. FIG. 11 shows an example in which the data-link layer frame 1112 includes an MATYPE field 1118 (e.g., 2 bytes), a UPL field 1120 (e.g., 2 bytes), a DFL field 1122 (e.g., 2 bytes), a SYNC field 1124 (e.g., 1 byte), a SYNCD field 1126 (e.g., 2 bytes), and a CRC field 1128 (e.g., 1 byte). This particular frame format is further described in the DVB S2 coding and modulation standard, In particular, the data-link layer 1104 may insert the channel bonding information into the MATYPE field 1118.

The framing of the data-link layer 112 is such that program packets are generally encapsulated into the payload 1116 of the data-link frame 1112, while the channel bonding information is added to the header 1204. However, note the packetized stream 1104 does not necessarily line up with the data-link layer frames 1112. This is shown by the dashed lines in FIG. 11, with the data-link layer frame 1112 breaking across program packets. The lack of alignment may be due to timing and packet size mismatches between various layers in the protocol stack, and because the data stream 1102 does not necessarily adhere to any fixed timing parameters or data formats.

In some implementations, the architectures may facilitate alignment by inserting packets (e.g., NULL packets) of any desired length, padding program packets (e.g., with NULL data), truncating program packets (or otherwise dropping program packet data), dropping program packets altogether, or in other ways. The data-link layer 1004 may execute the alignment in order to fit an integer number of program packets into a data-link layer frame. In some implementations, the data-link layer 1004 may communicate with other layers in the protocol stack, or other logic in the source 102, to provide guidance on timing, alignment, chunk sizes, or other bonding parameters that may facilitate alignment and channel bonding at the data-link layer.

Figure 12:
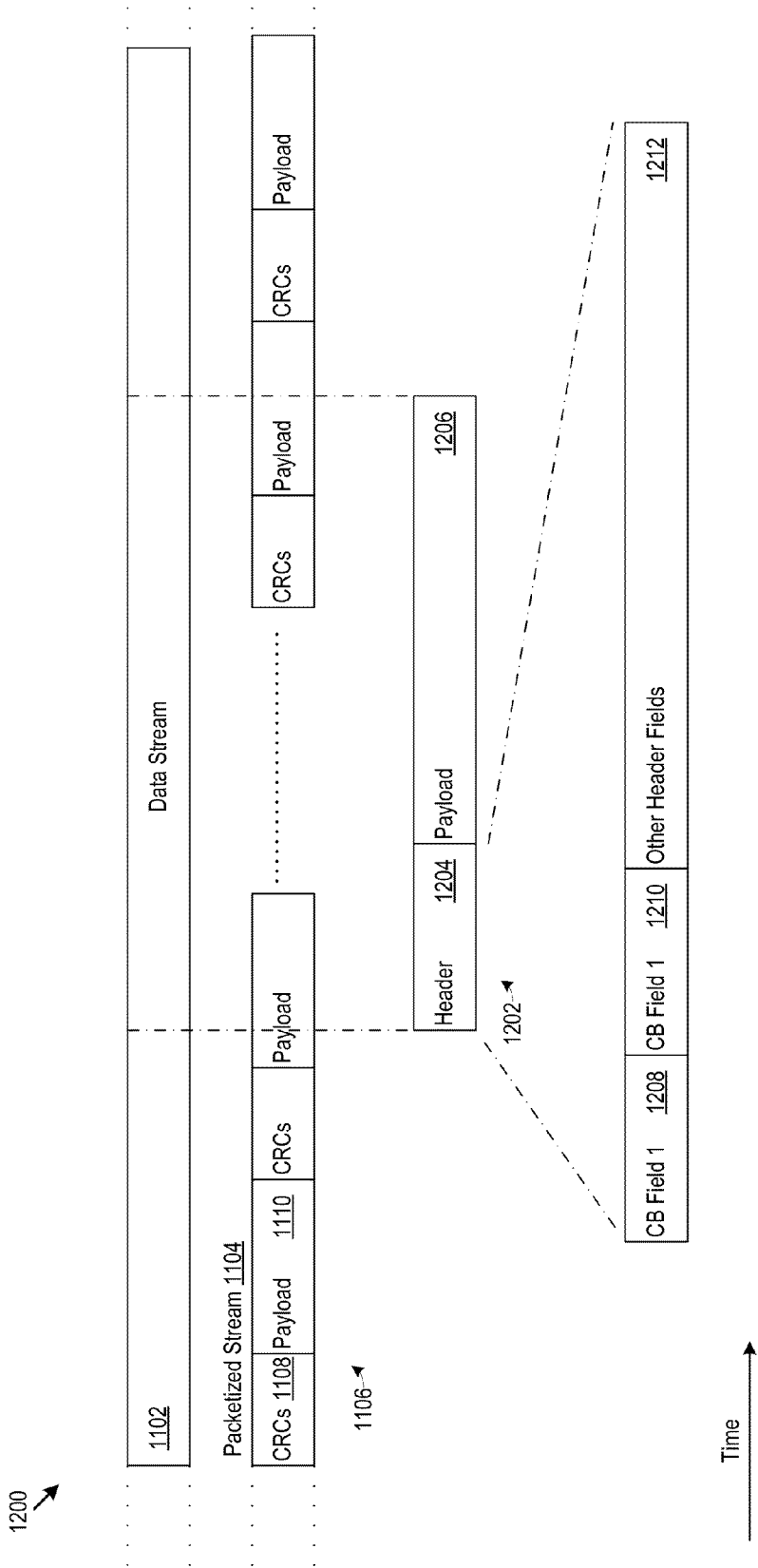
FIG. 12 shows an example of channel bonding at the data-link layer.

FIG. 12 shows an example of channel bonding using data-link layer frames 1200. As with FIG. 11, in FIG. 12 a data stream 1102 represents, for example, source data prior to packetization, and the packetized data stream 1104 arises from the data stream 1102. The data-link layer frame 1202 includes a header 1204 and a payload 1206. However, in FIG. 12, data-link layer frame 1202 has been designed to include fields specifically for channel bonding information. In the example in FIG. 12, the header 1204 includes the channel bonding field 1 1208 and the channel bonding field 2 1210. Other header fields 1212 carry other header information. Any number and length of channel bonding fields may be present in either headers or payload fields in the data-link layer frames to hold any desired channel bonding information.

Figure 13:
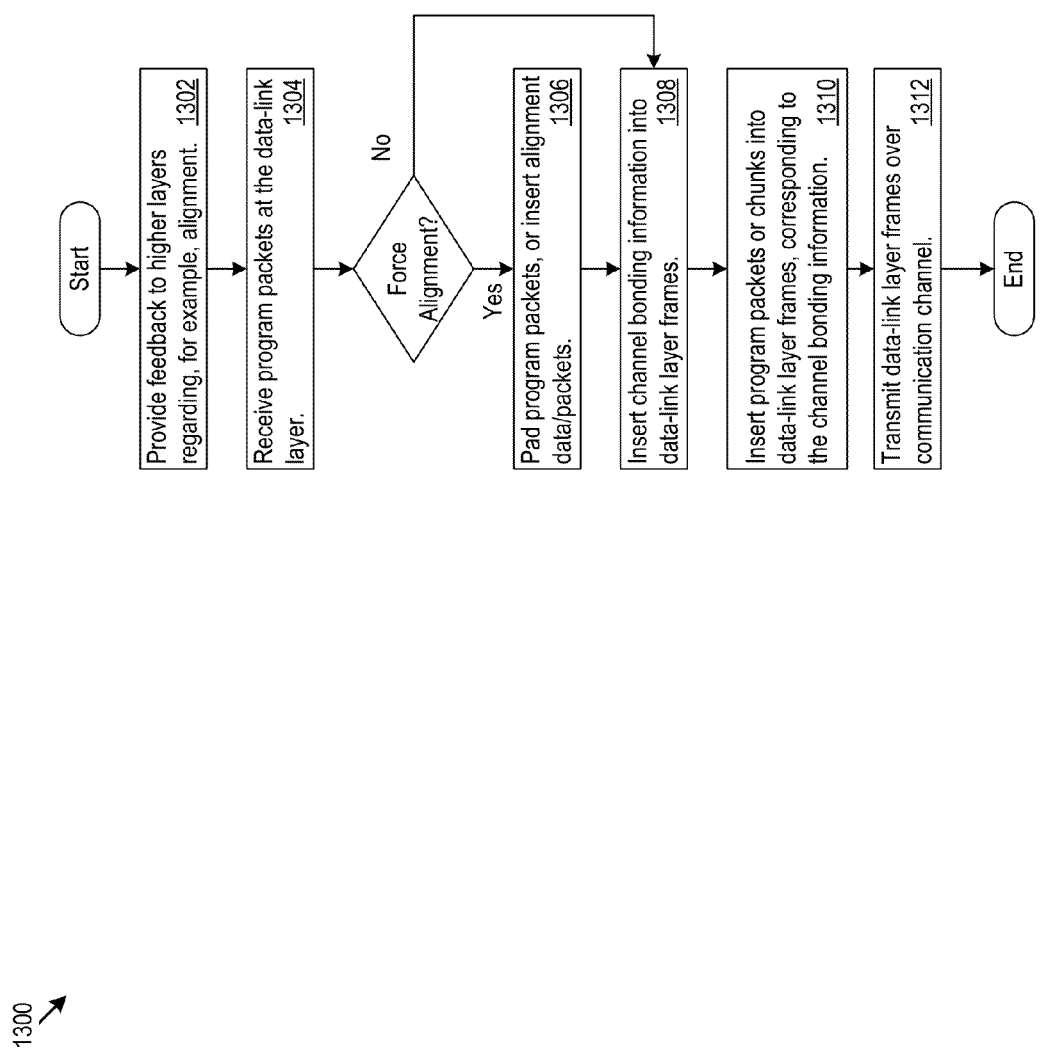
FIG. 13 shows an example of logic that a data-link layer may implement for channel bonding at the data-link layer.

FIG. 13 shows an example of logic 1300 that a data-link layer in the source 102 may implement for channel bonding at the data-link layer. The data-link layer may provide feedback to higher layers (1302). The feedback may inform the higher level layers about alignment, timing, or other considerations that affect how program packets break across or fit into data-link layer packets.

The data-link layer receives program packets from the higher level layers (1304). If the data-link layer will force alignment, then it may pad program packets, insert alignment packets, or even drop packets or parts of packets, so that the program packets fit within the data-link layer frame (1306) in a way that corresponds to the selected channel bonding configuration, including, for example, the chunk size. The data-link layer inserts channel bonding information into data-link layer frames (1308). In some implementations, the protocol stack at the source 102 does not generate separate marker packets for the channel bonding information. That is, the low level communication frames (e.g., the data-link layer frames) carry the channel bonding information in specific fields defined in the communication frames, so that no separate encapsulation of the channel bonding information (into marker packets, for example), is needed. Expressed yet another way, the data-link layer frames may have one less layer of encapsulation, e.g., encapsulating the channel bonding information directly into the low level communication frame, rather than multiple levels of encapsulation, e.g., encapsulating the channel bonding information first into a MP defined, e.g., at the same protocol level as a program packet, and then the MP into the communication frame.

The data-link layer also inserts program packets or chunks of packets into data-link layer frames. For example, the program packets may exist in the payload field of the data-link layer frames. The marker information may specify which packets are present in the data-link layer frame with the marker information (1310). The data-link layer then transmits the data-link layer frames over a communication channel that is part of a bonded channel group 112.

Figure 14:
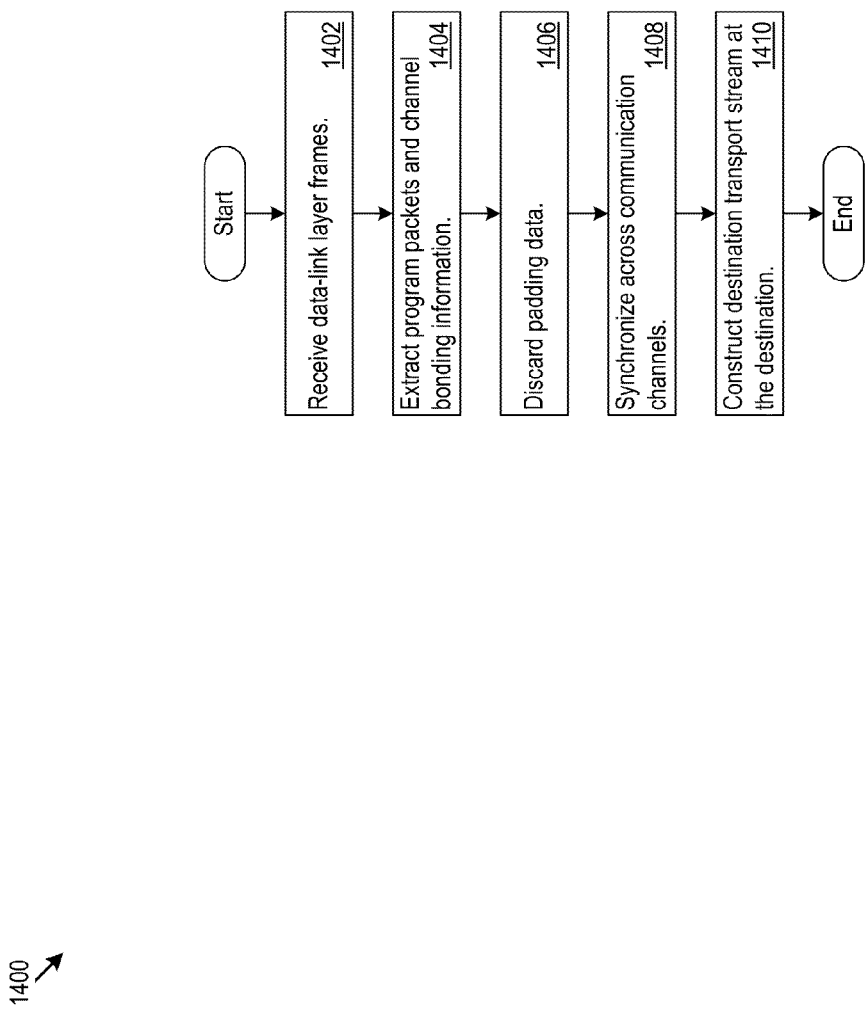
FIG. 14 shows an example of logic that a data-link layer may implement for channel debonding at the data-link layer.

FIG. 14 shows an example of logic 1400 that a data-link layer in the source 102 may implement for channel debonding at the data-link layer. The data-link layer receives data-link layer frames (1402). The data-link layer extracts the program packets and the channel bonding information from the data-link layer frames (1404). Any padding data in the program frames, or padding packets may be discarded (1406).

The destination 104 analyzes the channel bonding information to synchronize across multiple communication channels, as described above (1408). Accordingly, for example, the destination may align to channel bonding sequence information across multiple communication channels. Once synchronized, the destination 104 may construct the DTS 120, for example by round-robin adding chunks to the DTS 120 from the data-link layer frames, informed by the channel bonding information in the data-link layer frames (1410).

One example format for a MP is the following:

CBM_PID: ChannelBondingMarker PID, which may be a reserved PID value for a marker packet. In some implementations, MPs may include adaptation layer information and follow the MPEG2 TS packet structure, although some or all of the content of the packet will be specific to MP data instead of, e.g., program data. The bytes in the MP may be assigned as follows (as just one example):

Byte #1: 0x47 (MPEG2 TS pre-defined sync byte)
Byte #2/3: CBM_PID+TEI=0, PUSI=0, priority=1
Byte #4: SC='b00, AFC='b11 (no payload), CC=0x0
Byte #5: Adaptation_length='d183
Byte #6: Flags=0x02, e.g., only private data is present
Byte #7: Private data_length='d181
Byte #8: Number of channels in Channel Bonding group
Byte #9/10: CBM_Sequence_Number (CBM_SN)
Byte #11/12/13/14: CBM_SIZE This generic MPEG2 TS packet syntax is further explained in ISO/IEC 13818-1, section 2.4.3.2, "Transport Stream packet layer".

As discussed above, multimedia content delivery, especially video delivery, requires entertainment networks to provide higher bit rates for supporting the distribution of multiple-quality video and HDTV or Ultra-HDTV streams from a central location, along with entire home coverage. Since the video applications are sensitive to bandwidth fluctuations, guaranteed bandwidth and quality of service (QoS) requirements are very hard to achieve for high quality video delivery. For example, products attempting to use wireless local area network (WLAN) technology for HD video distribution may fall well short of consumer expectations for link range and picture quality. One of the biggest deficiencies has been inadequate effective throughput. Although not a solution for all video-handling challenges, higher throughput may improve immunity to interference while delivering a means to handle degraded link conditions. Additionally, any excess bandwidth can be traded for extended reach and lower power consumption. A new technology, called orbital angular momentum (OAM), may be utilized to make additional communication channels available for bonding so as to transmit multiple channel bonded signals as described herein to achieve a higher effective throughput.

In physics, electromagnetic waves can have both spin angular momentum (SAM) and orbital angular momentum (OAM) 1712. An illustration of OAM is provided in FIG. 17A. Using the analogy of a planet orbiting the sun, spin momentum is the planet rotating on its own axis while orbital momentum is the planet orbiting around the sun. The applications of OAM can include exploiting the OAM property of laser fields to trap and manipulate atoms, molecules, and microscopic particles. The OAM of electromagnetic waves can in theory have an infinite number of distinct states or orbits (e.g., distinct orbits 1714, 1716 illustrated in FIG. 17), denoted by natural number l. The number of distinct states achievable in practice is, however, limited by physical issues such as the sensitivity of the transmitting and receiving devices.

In conventional optical and wireless communications, only the spin angular momentum of electromagnetic waves is modulated and used to carry information. However, orbital angular momentum could also be added to optical and wireless signals, effectively creating distinct spiral signals on the same wavelength or frequency band. In this manner, in one or more embodiments, orbital angular momentum can be used to transmit multiple information streams on the same wavelength or frequency simultaneously, thus creating multiple information channels on the same wavelength or frequency.

With the advancement in digital signal processing it is possible to create optical communications systems that utilize OAM to achieve very fast data transmission rates (terabits per second and beyond). For wireless communications, the generation of multiple OAM states is harder than the optical application. However, it has been shown that by properly controlling the antenna arrays, different OAM states can also be generated and combined to reproduce field characteristics, in the radio domain, which are very similar to those obtained in optics.

In one or more embodiments, the antenna structures for the generation and detection of OAM signals over an OAM communication link may include a parabolic antenna or antenna array. In one example, a helicoidal parabolic antenna 1718 may be used as illustrated in FIG. 17B. A helicoidal parabolic antenna 1718 may be formed from transforming a parabolic dish antenna into a vortex reflector by properly elevating the dish surface with respect to the azimuthal angle. This may be visualized by cutting a radius in a dish and flexing the dish on one side of the cut relative to the other side perpendicular to the dish surface. Accordingly, a helicoidal transmission signal with an orbital angular momentum associated with the helicoidal parabolic antenna may be generated. A pair of helicoidal parabolic antennas may be used for an OAM communication link: one for the transmitter 1718 and the other for the receiver 1720. Although, it is contemplated herein that other antenna structures capable of transmitting and receiving signals having an OAM may also be used.

In another example, an antenna array may be used for generating and detecting OAM signals as illustrated in FIG. 17C. A uniform circular array (UCA) is one particular type of antenna array used for the generation and detection of OAM signals. Although, it is contemplated herein that other antenna arrays capable of transmitting and receiving signals having an OAM may also be used. Uniform circular arrays 1730 have a number of antenna elements (e.g. 1732, 1734, 1736) evenly spaced along a circle. For the generation of OAM-like signals, the antenna elements in a transmit UCA are fed with the identical input signal, but with a successive phase delay from element 1732 to element 1734. The OAM signal is decoded by the receiver with proper processing of the received signals in all antenna elements of the receive UCA 1740. An example, a UCA of 8 elements is shown in FIG. 17C although any number of elements may be used. In addition, it is contemplated herein that different types of transmitting and receiving antennas may be used in combination.

Several channel bonding processing options have been discussed herein. In one embodiment, the distributor 108 adds marker packets on a per-channel basis, for example in a round-robin manner. In another embodiment, the distributor 108 generates and adds markers on a per-chunk basis, for example in a round-robin manner at chunk boundaries. In another embodiment, when packets from the same program will be routed to multiple communication channels, each packet receives a program ID and a sequence ID, and no marker packets are needed. In yet another embodiment, spare bits in network frames defined below the network layer, e.g., at the data-link layer, carry channel bonding information to the source 104. Further other embodiments or combinations of these embodiments may be utilized. However, any of the architectures or features of these techniques may be used together in conjunction with the discussed implementations for channel bonding with orbital angular momentum.

The channel bonding principles of the present disclosure can thus be extended to create additional orbital angular momentum channels on the same wavelength or frequency as required to accommodate the aggregate transmission bandwidth required, where the additional orbital angular momentum channels created are used as a bonded set of channels. In one embodiment, for a given communication channel configured to transmit a certain frequency, additional bonded orbital angular momentum channels may be generated and used at that same frequency but with each channel having a different orbital angular momentum. In some embodiments, the additional bonded orbital angular momentum channels that are generated may be generated at different frequencies than other channels in the bonded set of channels. By making use of additional channels each having a different orbital angular momentum, far greater amounts of data can be communicated between a source 102 and a destination 104 where the number of distinct communication channels (i.e., number of distinct orbital states at each frequency or wavelength) are practically only limited by certain physical issues such as the sensitivity of the transmitting and receiving devices. In one or more embodiments, the number of OAM channels bonded together on each frequency or wavelength may be selected based on a number of factors, including the sensitivity of the transmitting and receiving devices or desired or available complexity of the transmission.

In one or more embodiments, a system and associated procedures are described that realize the bonding of multiple OAM channels with interleaving and redundancy in both l-dimension and frequency-dimension. Such bonding can substantially increase potential data transmission rates as well as the overall reliability of the transmission.

For data communication, OAM can send an independent data stream through each "orbit" channel. This increases the channel capacity by a factor equivalent to the number of transmit streams. To support the QoS required by video delivery, in accordance with one or more embodiments, the disclosed OAM method uses orbital multiplexing on top of other multiplexing techniques to enhance robustness and reliability. For example, orbital multiplexing can be used on top of orthogonal frequency-division multiplexing (OFDM). Orbital multiplexing codes the information across the orbit and spectral domains by using multiple transmit and receive "orbital" devices. This, combined with OFDM modulation on each orbital channel, increases the diversity and, hence, the robustness of the system. This enables OAM to withstand channel impairments such as inter-symbol interference (ISI) and other interferences. Although, other known and future developed modulation techniques may be utilized in connection with orbit multiplexing used with OAM channels.

In one or more embodiments, one reason for choosing OFDM as a modulation method for each "orbit" or OAM channel is due to its robustness and high spectral efficiency for high data rate systems. OFDM divides the allocated spectrum into orthogonal subcarriers, and converts a serial input data stream into parallel data sequences, with each parallel data set being modulated by a bank of subcarriers. This allows every symbol to be modulated over a longer time duration, thus reducing the inter-symbol interference (ISI) effects caused by multipath propagation. Other advantages of OFDM include its scalability and easy implementation using a Fast Fourier transform (FFT).

Figure 18:
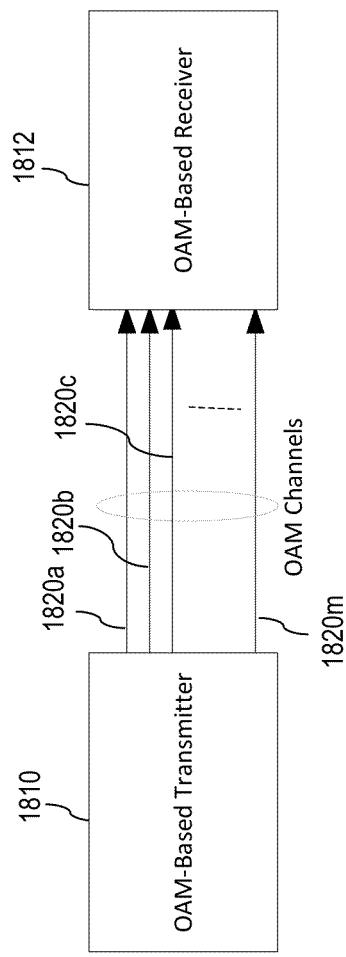
FIG. 18 is a schematic representation a OAM channel bonding system.

A network system for implementing OAM is provided in FIG. 18 in which an OAM-based transmitter 1810 and an OAM-based receiver 1812 are capable of supporting m distinct OAM states (or channels) 1820a-1820m. For instance, these states may be denoted as l=0, 1, 2, . . . , m−1. Furthermore, it can be assumed that the electromagnetic channel (optical or wireless) is impaired by noise, fading, and interferences. Some of these impairments are l-specific and others are frequency selective. While depicted in FIG. 18 as m distinct OAM channels (1820a . . . 1820m), it is understood that such OAM channels may also be transmitted over a single (or a plurality) of physical communication links between OAM transmitter 1810 and receiver 1812.

Figure 19:
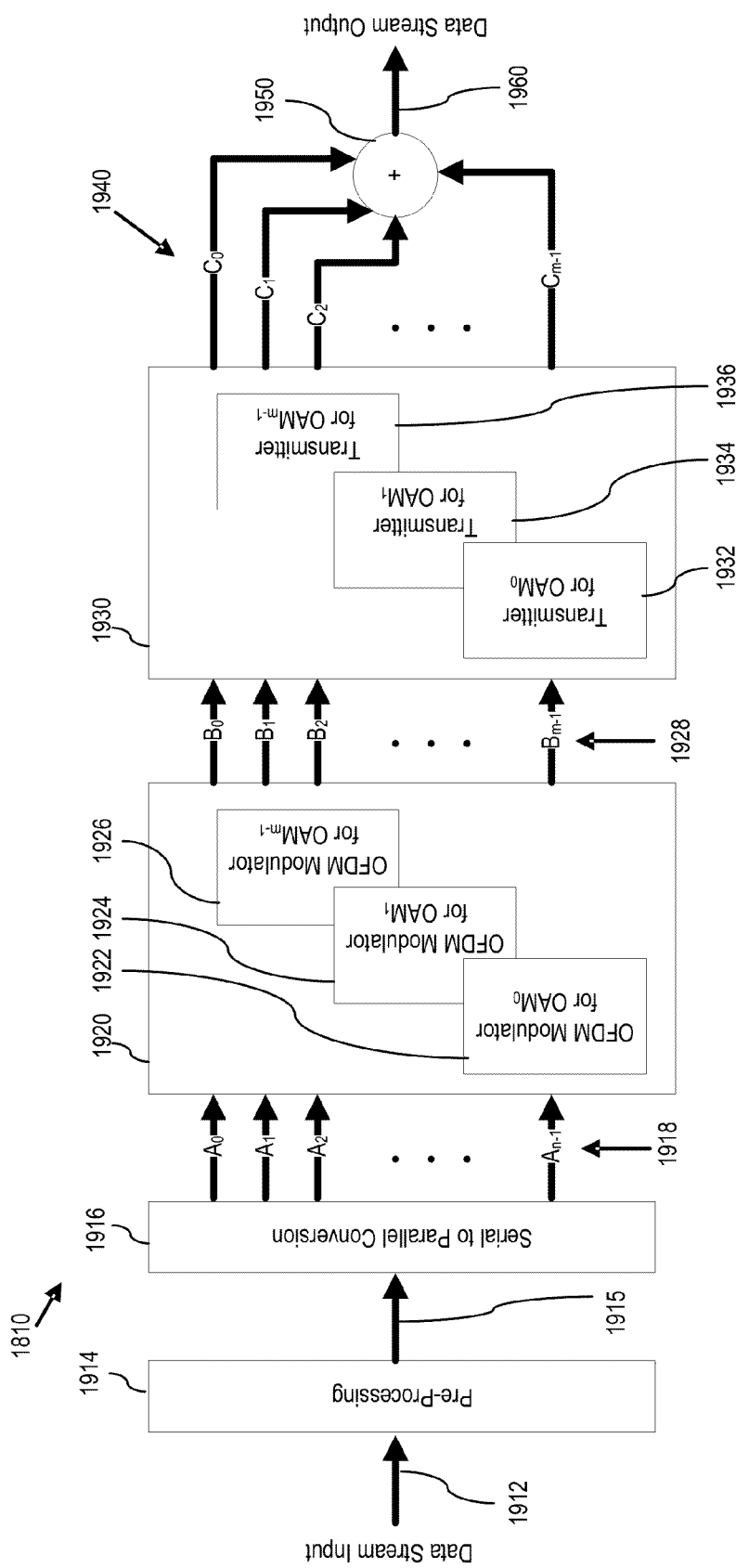
FIG. 19 is a schematic representation of a OAM-based transmitter.

FIG. 19 is a schematic view of an OAM-based transmitter 1810 (which corresponds to OAM-based transmitter 1810 of FIG. 18) in accordance with one or more embodiments. The OAM-based transmitter 1900 may be implemented in one or more channel bonding devices, including the various channel bonding implementations described herein. For example, the OAM-based transmitter 1900 may be a service provider head end (e.g., satellite or cable head end) for transmitting video or other broadcast data to a gateway or set top box or end user device. A data stream input 1912 may be received by a pre-processing unit 1914. The preprocessing unit 1914 may break the streams into groups of bits which may be packaged as individual packets or individual communication units. In this manner, the preprocessing unit 1914 may have the same functionality of the distributors described elsewhere in this application. The serial data 1915 from the preprocessing unit 1914 is provided to a serial-to-parallel converter 1916. The serial-to-parallel converter 1916 converts the serial stream 1915 into a parallel data stream 1918. The parallel data stream 1918 is provided to a modulator circuit 1920.

The modulator circuit 1920 may include a modulator for each orbital state. As such, each orbital state may correspond to a different channel. Each modulator may be an OFDM modulator corresponding to each orbital state (e.g. each level of orbital angular momentum). As such, modulator 1922 may correspond to the first channel, modulator 1924 may correspond to the second channel, and modulator 1926 may correspond to the last channel. It is understood that the number of channels is scalable based on application requirements. The modulator data 1928 is transmitted from the modulator circuit 1920 to transmitter circuit. The transmitter circuit 1930 may include an individual transmitter for each channel. For example, transmitter 1932 may be provided for the first channel. Further, the transmitter 1934 may be provided for the second channel, while transmitter 1936 may be provided for the last channel. The transmitter output 1940 is summed or multiplexed, for example, through an antenna arrangement 1950 (e.g. may be a single antenna or antenna array). The antenna arrangement 1950 may transmit data output stream 1960 to the receiving device for example, a set top box or gateway.

As the data stream input 1912 goes through preprocessing unit 1914, the preprocessing unit 1914 may divide the bit stream into the groups of n bits $(a_0, a_1, a_2, \ldots, a_{n-1})$, with n being the number of subcarriers supported by OFDM modulators 1922, 1924, 1926. Each of these bit groups is mapped into another group of n output bits. This mapping depends on the type of the information carried by these data bits. Some types of information require faster transmission with low requirement on transmission reliability, while others require high transmission reliability with slower transmission.

Figure 20:
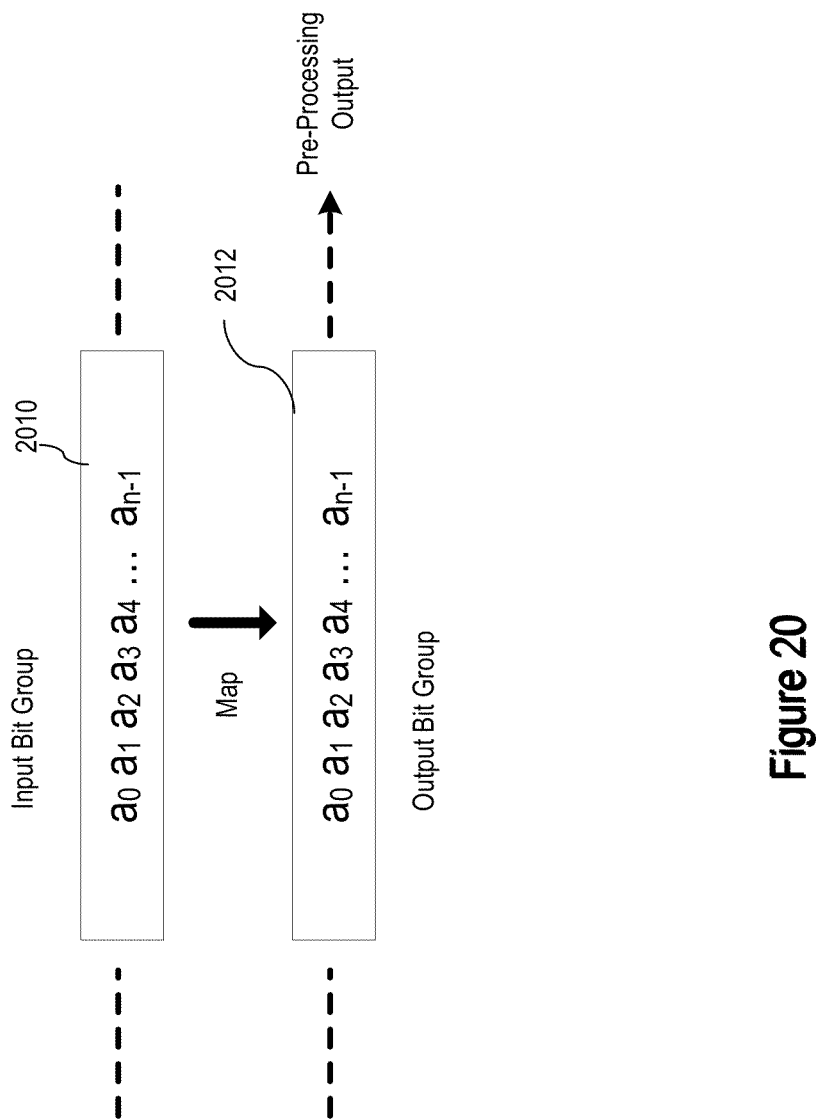
FIG. 20 is a schematic illustration of direct data mapping.
Figure 21:
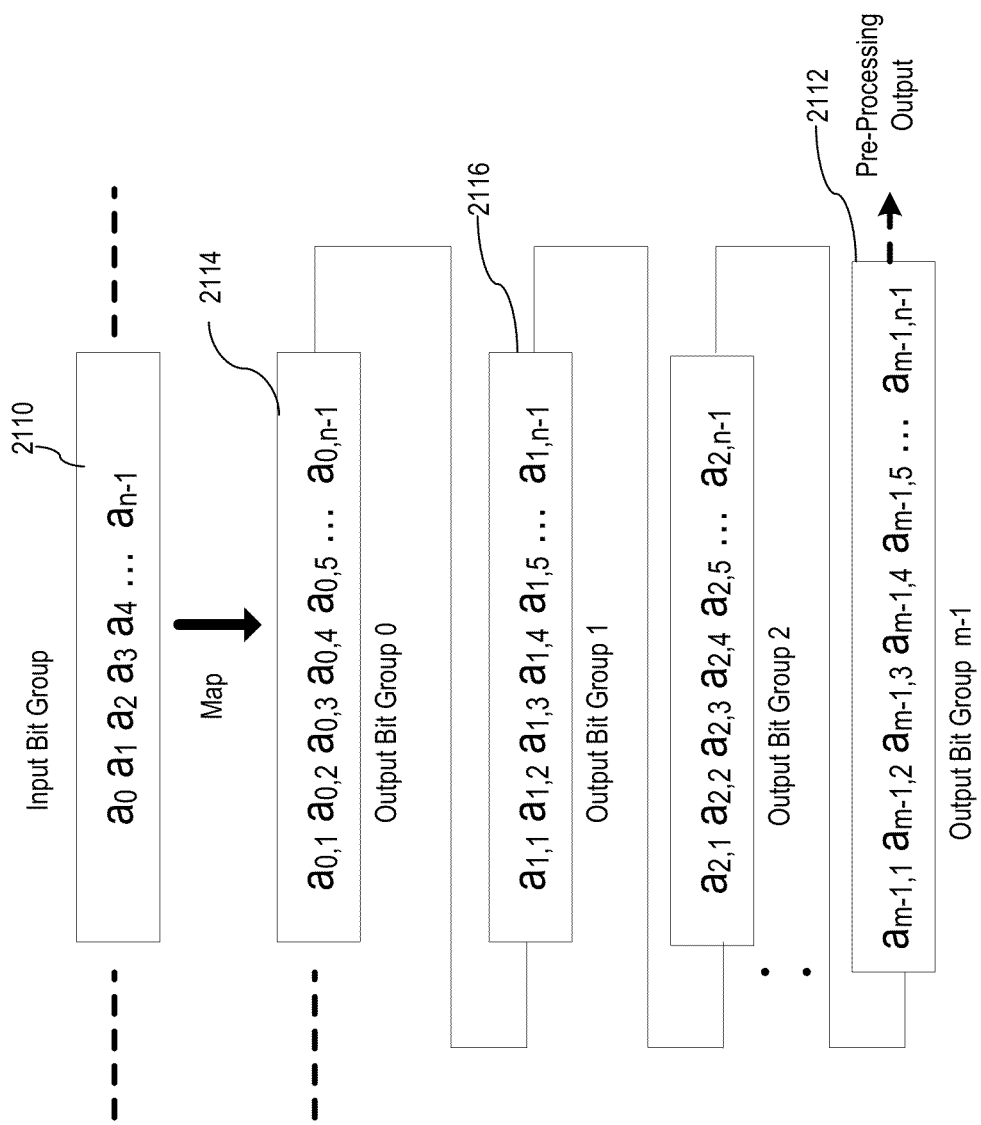
FIG. 21 is a schematic illustration of interleaved data mapping.

For data requiring fast transmission, the bits of each input bit group 2010 may be directly mapped as the preprocessor output bit group 2012 without any alternation, as shown in FIG. 20. However, for the types of information that require high transmission reliability, each input bit group 2110 may be mapped into multiple preprocessor output bit groups 2112, 2114, 2116, 2118 via an interleaving map method, as illustrated in FIG. 21.

Figure 22:
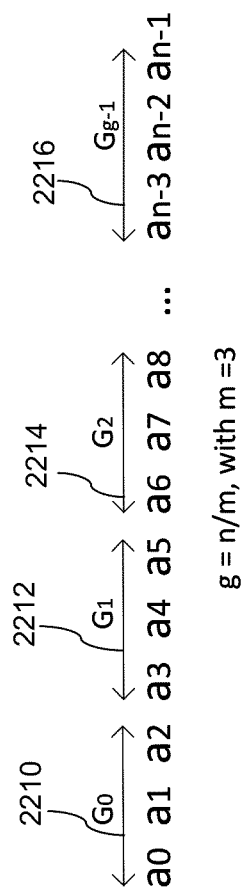
FIG. 22 is a schematic illustration data groupings.
Figure 23:
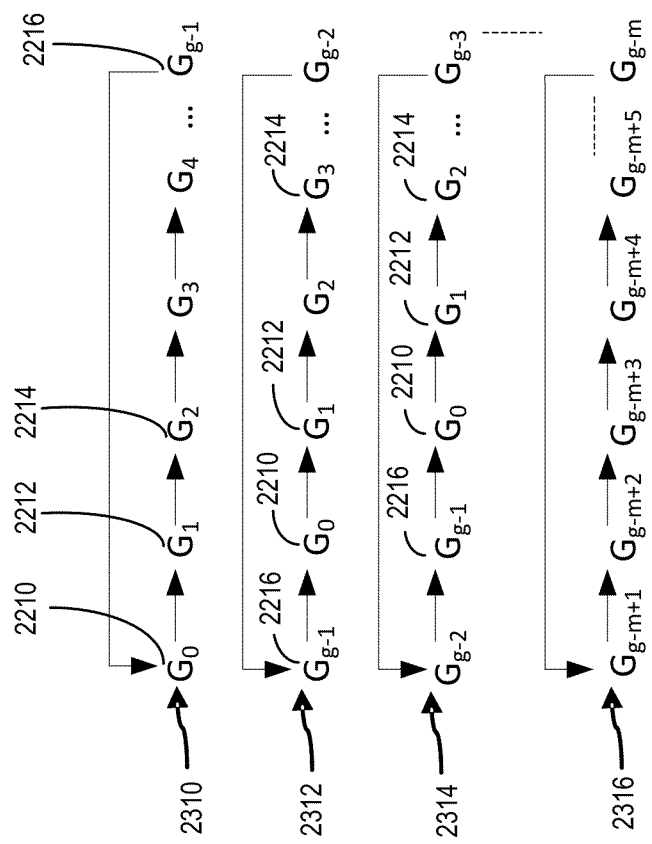
FIG. 23 is a schematic illustration of group shifting for each channel.

In the above interleaving procedure, the n bits of each input bit group are repeated m times, where m is the number of OAM states that the OAM transmitter and receiver are capable of supporting. For each repeated bit group 2112, 2114, 2116, 2118, the order of the n bits is reshuffled. One exemplary reshuffling scheme is shown in FIG. 22 (assuming m=3) and FIG. 23. First, each n bits in an input group are divided into g=n/m bit subgroups 2210, 2212, 2214, 2216, assuming n is a multiple of m. The g bit subgroups are, then, shifted right one subgroup for each repetition 2310, 2312, 1214, 2316. The repeated and reshuffled group bits are, then, concatenated and output from the preprocessor 1914.

Figure 24:
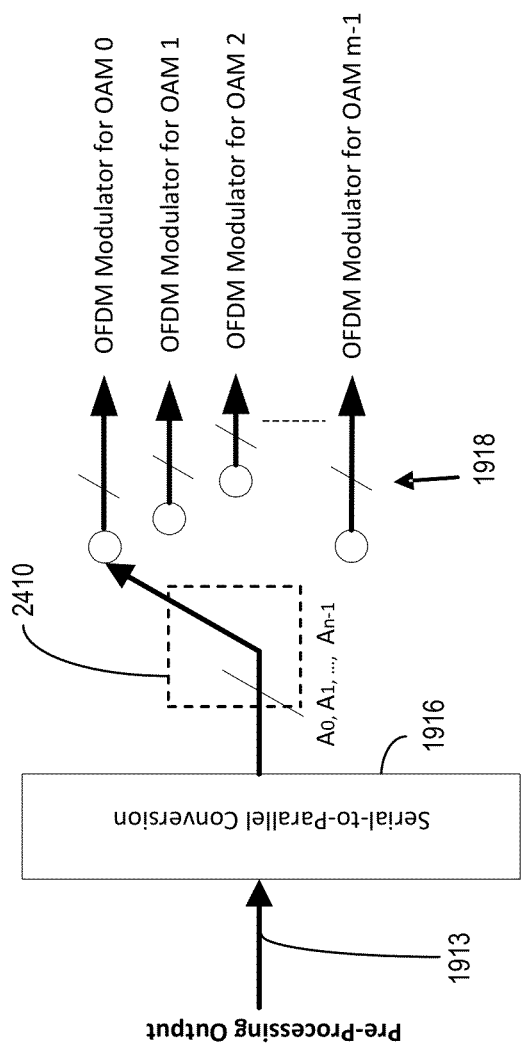
FIG. 24 is a schematic illustration of the serial-to-parallel conversion.

The output bits from the preprocessing module 1914 may constitute a continuous serial bit stream. This bit stream may be provided to the serial-to-parallel conversion module 1916, as shown in FIG. 24. This serial-to-parallel conversion module 1916 distributes 2410 each n serial bits $A_0, A_1, A_2, \ldots$, and $A_{n-1}$ in a bit group into an OFDM modulator 1922, 1924, 1926 of modulator circuit 1920 as parallel OFDM symbol bits of the modulator. For one example scheme of distribution, the serial-to-parallel conversion module, distributes the OFDM symbols in a round-robin fashion. Although, any distribution scheme may be used as discussed above.

Figure 25:
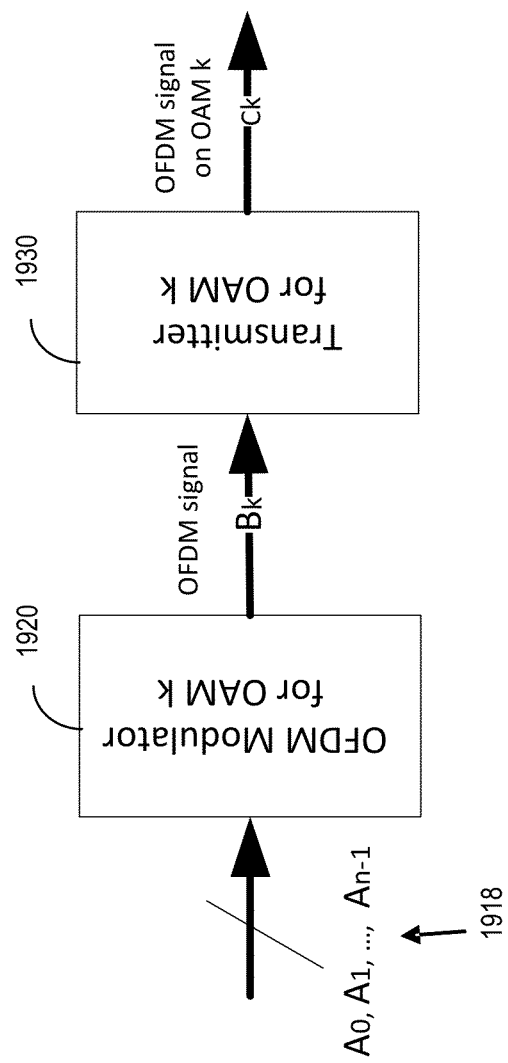
FIG. 25 is a schematic illustration of the ODFM Modulator and transmitter.

There are m OFDM Modulators, one for each supported OAM state. The output OFDM signal of a modulator 1920 is then sent to the corresponding OAM transmitter 1920 as illustrated in FIG. 25. The OAM transmitter 1930 transmits the signal on the OAM channel of a given OAM state.

Figure 26:
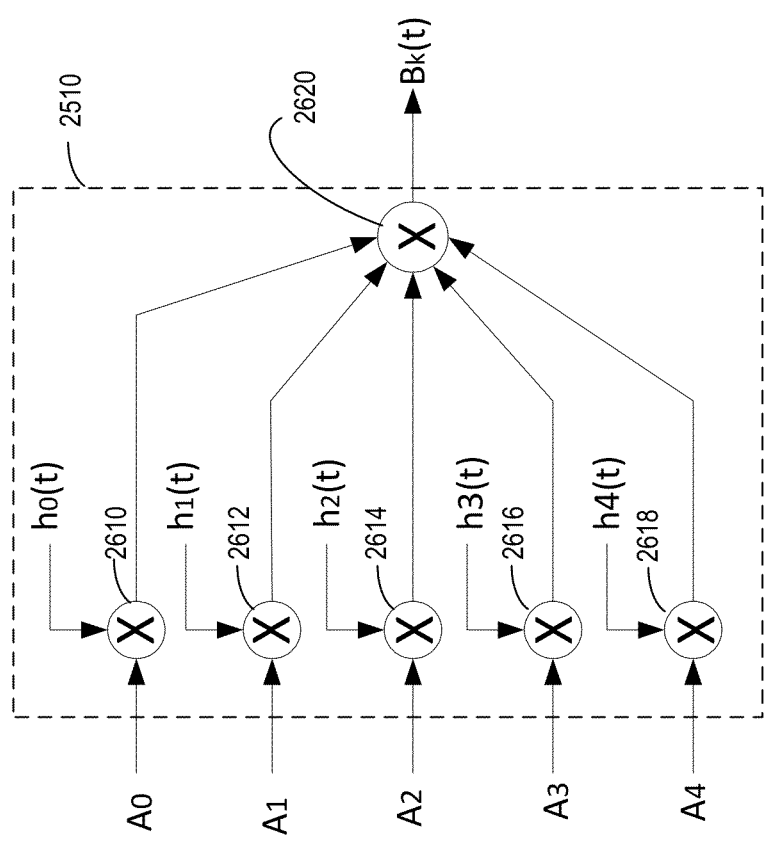
FIG. 26 is an illustration of the modulation process.
Figure 27:
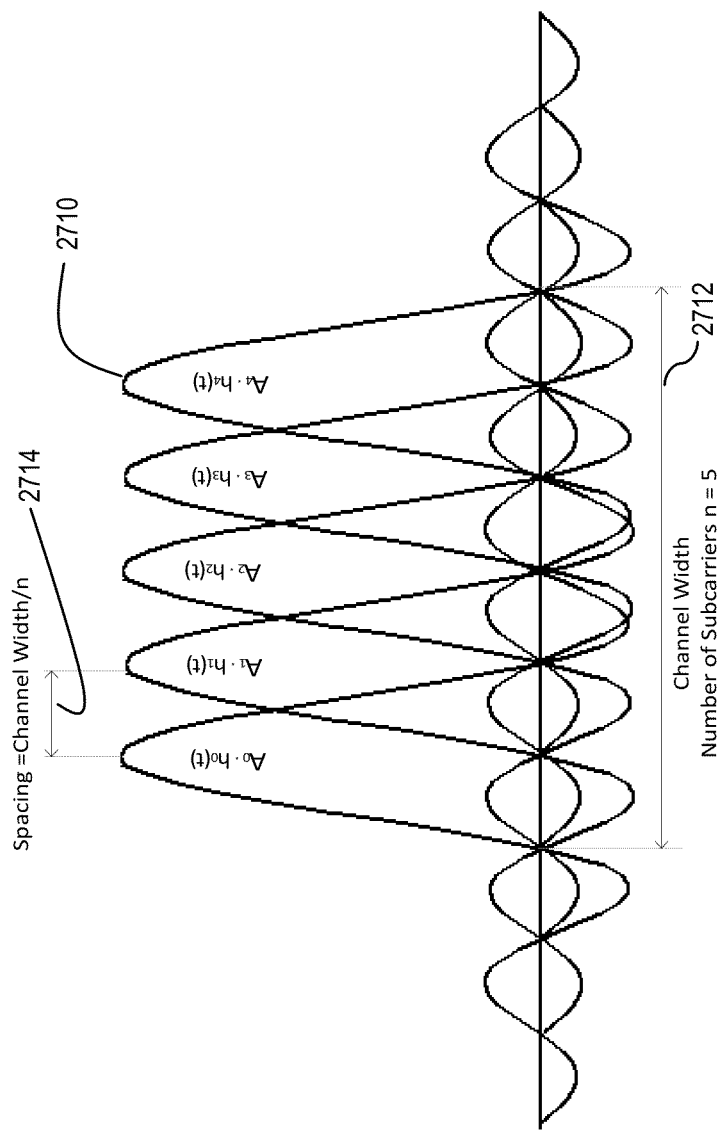
FIG. 27 is an illustration of a transmitted channel with sub-carriers.

In one example, the operation of an OFDM modulator k is shown in FIG. 26, assuming that n=m=5 (thus g=1). Each OFDM symbol bit $A_i$(i=0, 1, 2, 3, 4) is modulated by a subcarrier function hi(t) 2610, 2612, 2614, 2616, 2618. The modulated signal bits are summed as denoted by reference numeral 2620. The sum of all modulated symbol bits is output to the transmitter for OAM k as an OFDM signal 2710 $B_k$. The OFDM signal $B_k$ is illustrated in the frequency domain in FIG. 27. A sub-carrier spacing 2714 may be defined as the channel width divided by the number of subcarriers. The channel width is denoted by reference numeral 2712.

Figure 28:
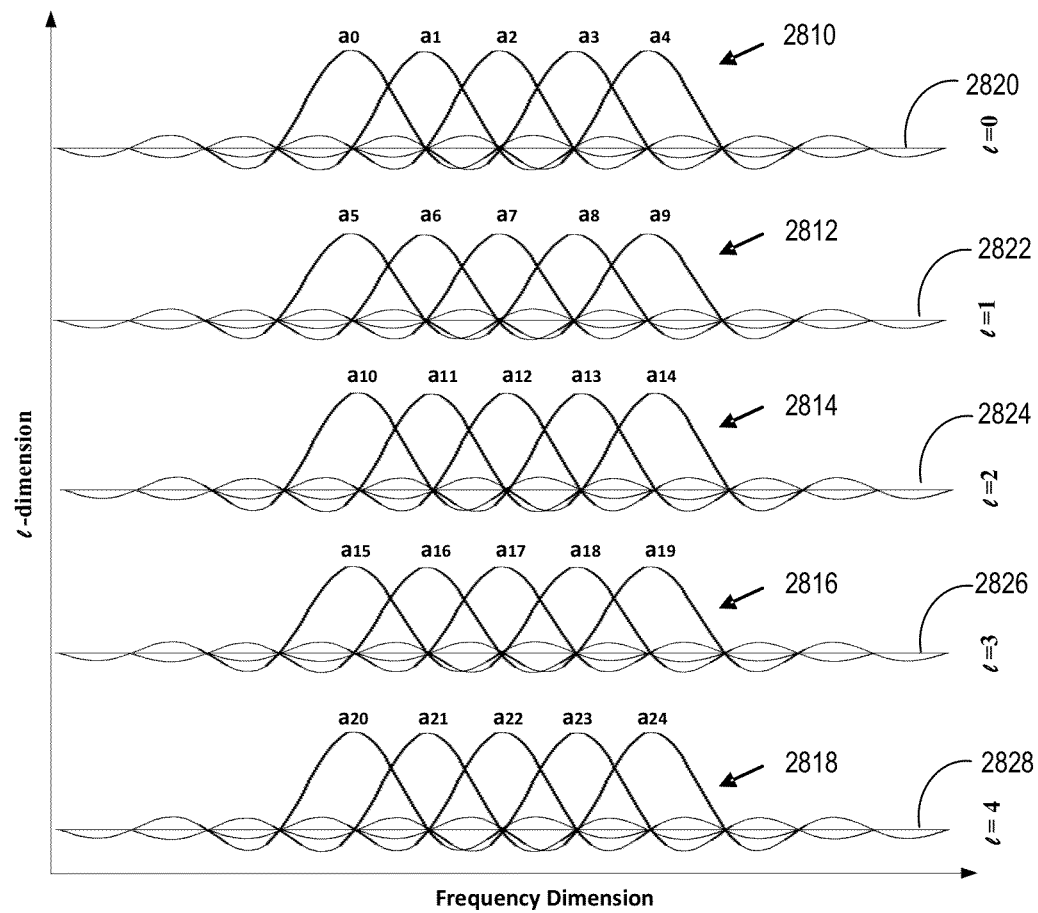
FIG. 28 is an illustration of each transmitted channel when mapped directly.

For the direct map method of the preprocessing module, FIG. 28 shows that input bit streams $a_0, a_1, a_2, \ldots,$ and $a_{n-1}$ are directly mapped into five distinct OFDM symbols. Each of these symbols 2810, 2812, 2814, 2816, 1818 are carried on a separate "orbital" or OAM channel 2820, 2822, 2824, 2826, 2828.

Figure 29:
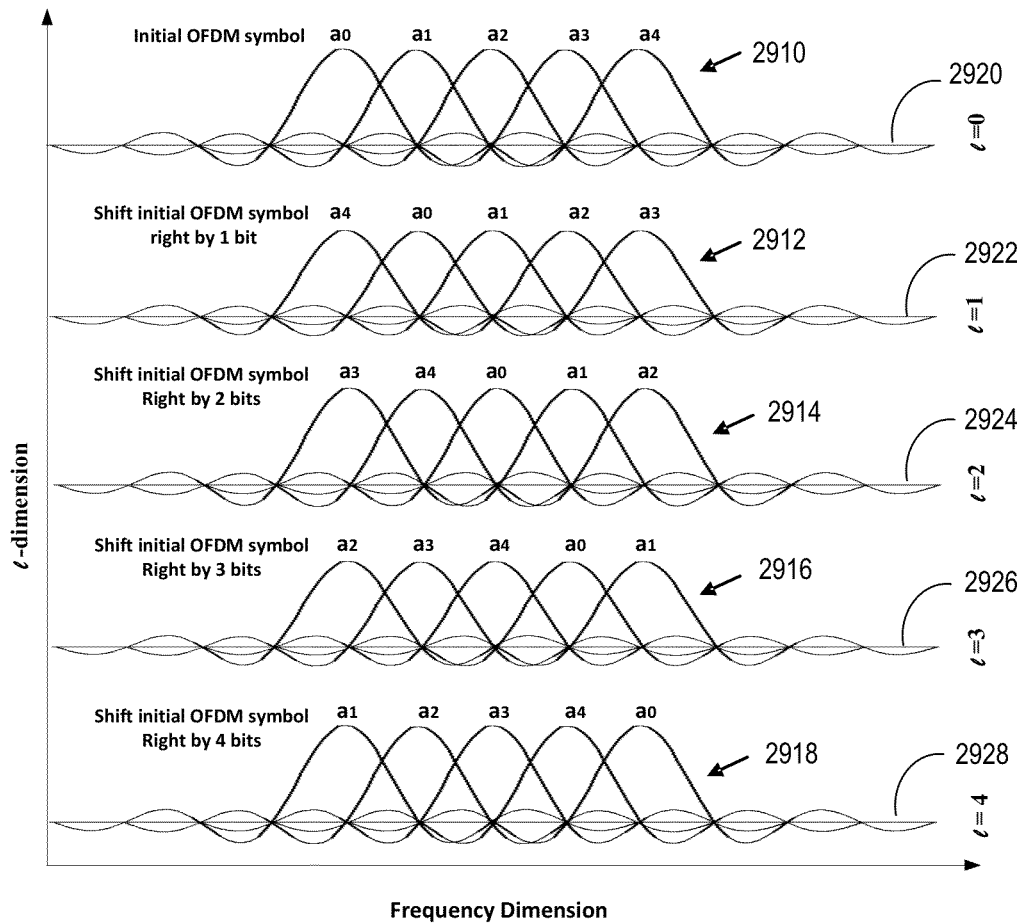
FIG. 29 is an illustration of each transmitted channel with interleaving.
Figure 30:
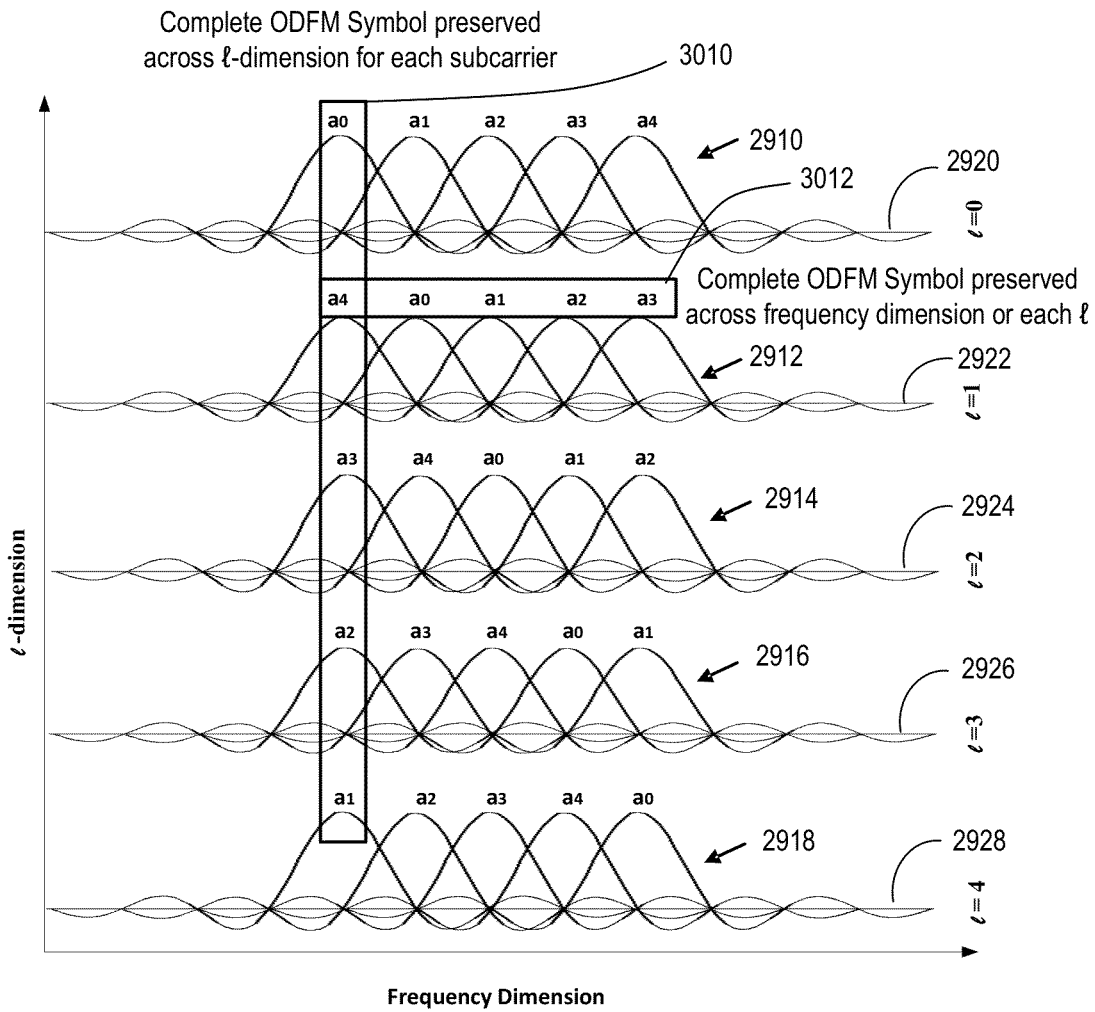
FIG. 30 is an illustration of the interleaved transmitted channels and highlighting data redundancy.

As can be seen, the direct map method does not provide any redundancy across l-domain, since the input data bit stream is not repeated. In contrast, for the interleaving map method of the preprocessing module, each five bits of the input data bit group ($a_0, a_1, a_2, a_3,$ and $a_4$) are repeated five times, with each repeated five bits being consecutively shifted, as illustrated in FIG. 29. As such, a distinct OFDM symbol 2910, 2912, 2914, 2916, 2918, is formed on each channel 2920, 2922, 2924, 2926, 2928, containing the same five bits. The above interleaving procedure allows the input data bit stream to be transmitted with redundancy 3010 across l-domain, as shown in FIG. 30. In addition, the complete OFDM symbol is preserved 3012 across both the frequency dimension and the l-dimension.

As mentioned above, the channels between the OAM-based transmitter 1810 and the OAM-based receiver 1812 may be subject to l-specific, as well as, frequency-selective impairments. The information bits that are directly mapped by the preprocessing module are protected by the OFDM's robustness against frequency selective impairments in each OAM channel. However, directly mapped information bits may not be protected against l-specific impairments, since no redundancy is provided for the l-dimension. In contrast, the information bits that are mapped by the preprocessing module through the interleaving procedure are protected by the OFDM's robustness against frequency selective impairments in each OAM channel. The information bits are also protected against l-specific impairments, since each OFDM symbol is repeated across the OAM domain. Furthermore, because the information of each OFDM symbol is carried on each subcarrier, the complete OFDM symbol bits can be recovered, as far as, the information bits on any subcarrier across l-domain can be correctly decoded (even if all other subcarriers are corrupted and their carried bits cannot be correctly decoded).

Figure 31:
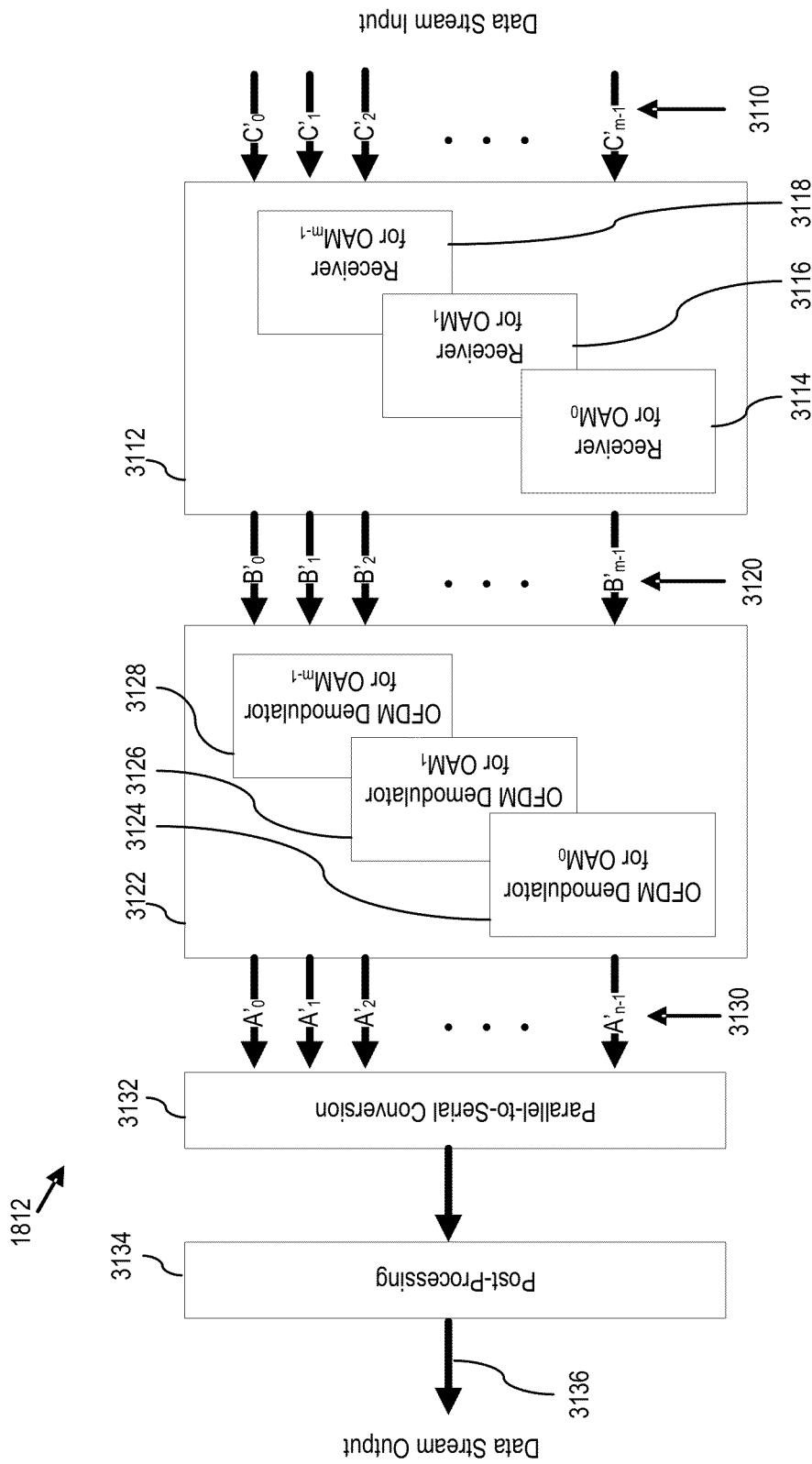
FIG. 31 is a schematic illustration an OAM receiver for channel bonding.

FIG. 31 is a schematic view of an OAM-based receiver 1812 in accordance with one or more embodiments The data stream input 3110 is received by the OAM-based receiver 1812 from the OAM-based transmitter 1810. The data stream input 3110 is provided to a receiver circuit 3112. The receiver circuit 3112 includes a receiver for each orbital state and/or channel. As such, receiver 3114 may be configured for a first channel (e.g., OAM state 0). Further, receiver 3116 may configured to receive a second channel (e.g., OAM state 1) and receiver 3118 may configured to receive the last channel (e.g., OAM state m−1). The receiver circuit 3112 provides the parallel orbital channels to demodulator circuit 3122. The demodulator circuit 3122 may include a demodulator for each channel. For example, the first channel may be demodulated by demodulator 3124. The second channel may be demodulated by demodulator 3126 and the last channel may be demodulated by demodulator 3128. In some implementations, the demodulators 3124, 3126, 3128 may be OFDM demodulators. The demodulator circuit 3122 may remove the $h_i$(t) function demodulation from each channel and reconstruct the data stream. The demodulator circuit 3122 may use the redundancy to correct any errors in the transmission and provide parallel outputs 3130 across the orbital channels to the parallel to serial conversion module 3132. The parallel to serial conversion module 3132 generates a single serial stream that is provided to the post processing module 3134. The post processing module 3134 may remap the bits into the original data stream and provide an output data stream 3136 matching original stream received by the OAM based transmitter.

Audio/video content is usually compressed and transmitted as a sequence of compressed frames. For the video content, there are usually three types of compressed frames (or pictures): I-frame (intra-coded picture), P-frame (predicated picture) and B-frame (bi-predictive picture). The I-frame allows the original video picture to be decoded (or decompressed) independently without any information from other frames. On the other hand, the P-frame relies on the previous frame for decoding. The B-frame needs the information from both previous and forward frames for decoding. To ensure the good quality of the decoded video at the receiving side, I-frames must be transmitted with high reliability.

In one or more embodiments, OAM channel bonding may be applied to the transmission of audio/visual data. The input A/V bit stream may be first classified into I, B, or P-frames. For the information bits of an I-frame, the interleaving procedure is carried out by the preprocessing module, ensuring its high transmission reliability. For the information bits of a B or P-frame, the direct mapping is carried out by the preprocessing module, increasing its transmission rate with lowered reliability.

Figure 32:
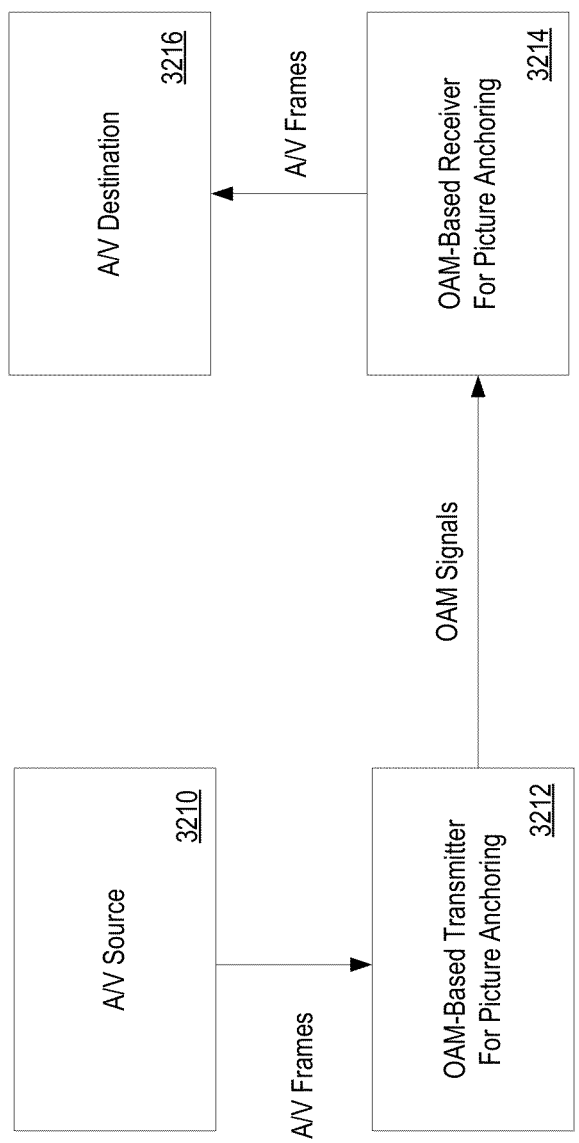
FIG. 32 is a schematic illustration of an OAM channel bonding system for audio/visual streams.

FIG. 32 is a schematic of a system for transmitting audio/visual data from an audio/visual source 3210 to an audio/visual destination 3216 using a channel bonded OAM technique. The audio/visual data is provided from the audio/visual source 3210 to an OAM based transmitter 3212. The OAM transmitter 3212 performs picture anchoring and distributes the audio/visual data across the bonded OAM signals (e.g. multiple channels having different levels of orbital angular momentum). The OAM transmitter 3212 transmits the OAM signals to the OAM based receiver 3214. The OAM based receiver 3214 reassembles the audio/visual data stream performs picture anchoring. The OAM based receiver 3214 then forwards the audio/visual signals to the audio/visual destination 3216.

Figure 33:
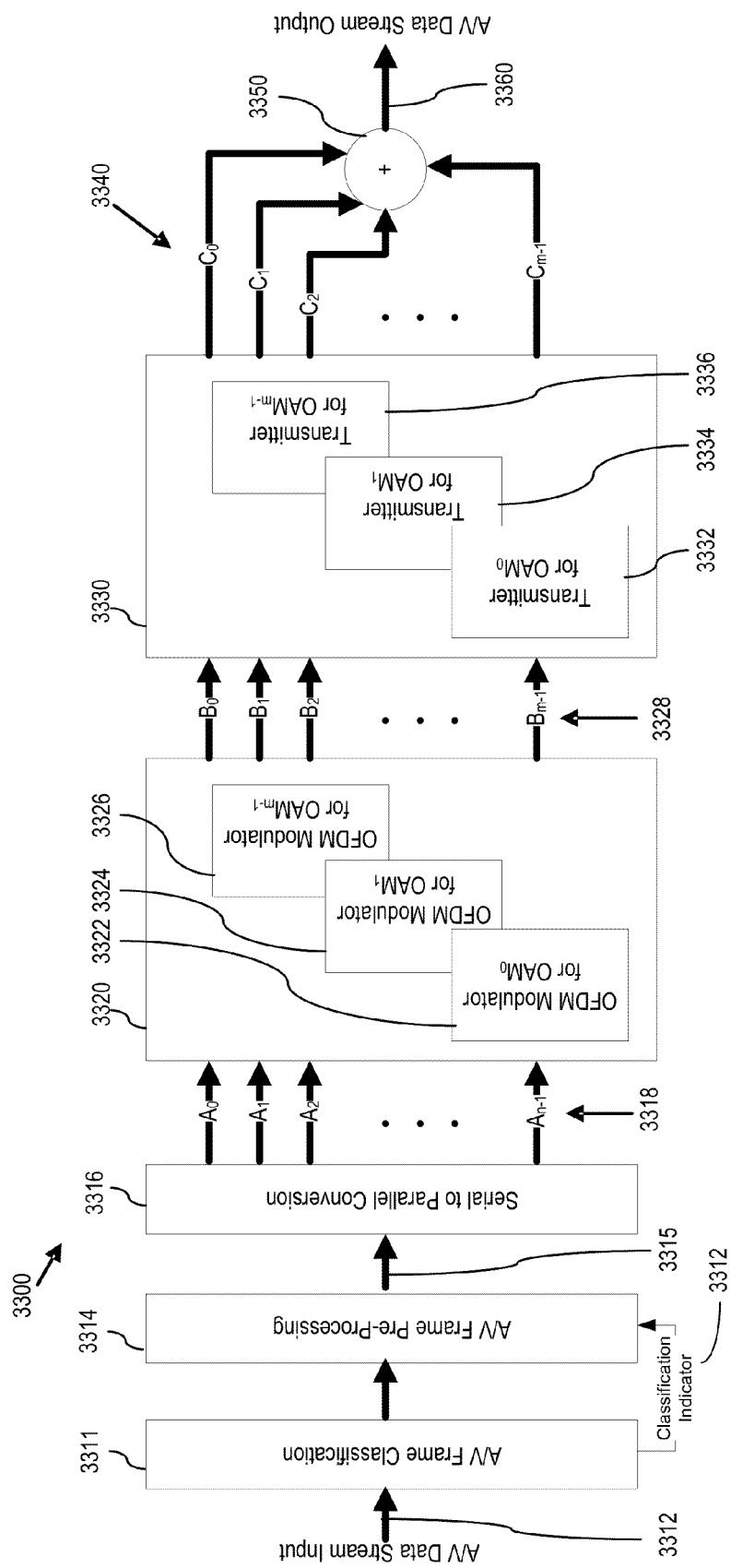
FIG. 33 is a schematic illustration of an OAM transmitter for channel bonding.

FIG. 33 is a schematic view of an OAM-based transmitter 3300 in accordance with one or more embodiments. The OAM transmitter 3300 may be implemented in one or more channel bonding devices and may operate in a manner similar to the OAM-based transmitter 1810. An audio/visual data stream input 3312 may be received by a frame classification unit 3311. The frame classification unit 3311 may provide the data stream and a classification indicator 3313 to the preprocessing unit 3314. The classification indicator 3313 may indicate the frame type (e.g. I, P, or B-frame) of each video frame. The preprocessing unit 3312 may break the stream into groups of bits which may be packaged as individual packets or individual communication units. In this manner, the preprocessing unit 3314 may have the same functionality of the distributors described elsewhere in this application.

For data requiring fast transmission, the bits of each input bit group may be directly mapped as the preprocessor output bit group without any alternation. However, for the types of information that require high transmission reliability, each input bit group may be mapped into the preprocessor output bit group via a interleaving map method, as described above with regard to FIGS. 20 and 21. The serial data 3315 from the preprocessing unit 3314 is provided to a serial-to-parallel converter 3316. The serial-to-parallel converter 3316 multiplexes the serial stream 3315 into a parallel data stream 3318. The parallel data stream 3318 is provided to a modulator circuit 3320.

The modulator circuit 3320 may include a modulator for each orbital state. As such, each orbital state may correspond to a different channel. Each modulator may be an OFDM modulator corresponding to each orbital state. As such, modulator 3322 may correspond to the first channel, modulator 3324 may correspond to the second channel, and modulator 3326 may correspond to the last channel. It is understood that the number of channels is scalable based on application requirements. The modulator data 3328 is transmitted from the modulator circuit 3320 to transmitter circuit 3330. The transmitter circuit 3330 may include an individual transmitter for each channel. For example, transmitter 3332 may be provided for the first channel. Further, the transmitter 3334 may be provided for the second channel, while transmitter 3336 may be provided for the last channel. The transmitter output 3340 is summed, for example, through an antenna arrangement 3350. The antenna arrangement 3350 may transmit data output stream 3360 to the receiving device for example, a set top box or gateway.

Figure 34:
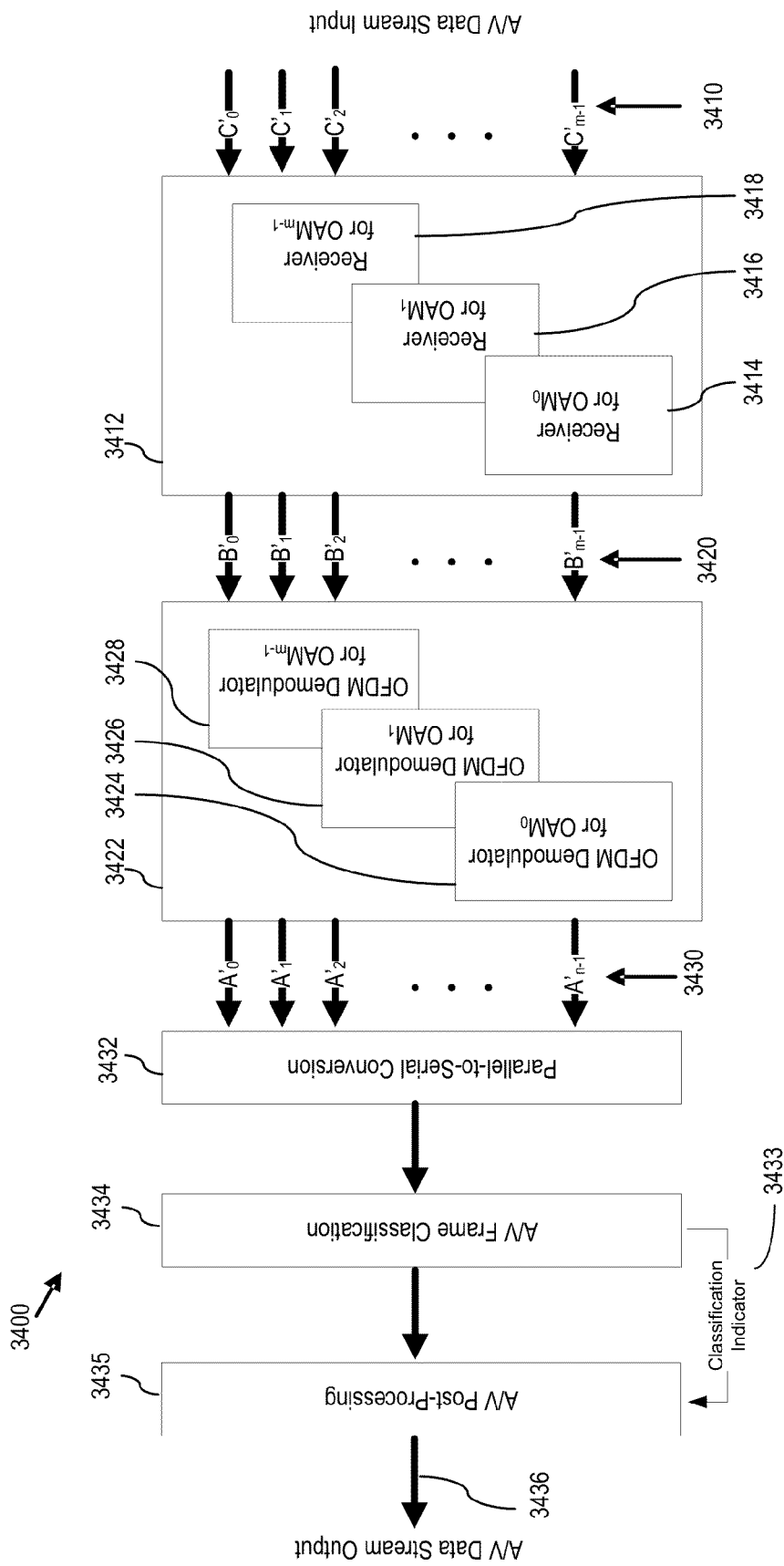
FIG. 34 is a schematic illustration of an OAM receiver for channel bonding.

FIG. 34 is a schematic view of an OAM-based receiver 3400 for receiving audio/video data over bonded OAM channels. The data stream input 3410 is received from the OAM-based transmitter 3300. The audio/video data stream input 3410 is provided to a receiver circuit 3412. The receiver circuit 3412 includes a receiver for each orbital state and/or channel. As such, receiver 3414 may be for the first channel. Further, receiver 3416 may receive the second channel and receiver 3418 may receive the last channel. The receiver circuit 3412 provides the parallel orbital channels to demodulator circuit 3422. The demodulator circuit 3422 may include a demodulator for each channel. For example, the first channel may be demodulated by demodulator 3424. The second channel may be demodulated by demodulator 3426 and the last channel may be demodulated by demodulator 3428.

In some implementations, the demodulators 3424, 3426, 3428 may be OFDM demodulators. The demodulator circuit 3422 may remove the $h_i(t)$ function demodulation from each channel and reconstruct the data stream. The demodulator circuit 3422 may use the redundancy to correct any errors in the transmission and provide parallel outputs 3430 across the orbital channels to the parallel to serial conversion module 3432. The parallel to serial conversion module 3432 generates a single serial stream that is provided to a frame classification unit 3434. The frame classification unit 3434 may determine the frame type. The frame classification unit 3434 may provide the video stream and a classification indicator 3433 to the post processing module 3435. The post processing module 3435 may remap the bits into an output data stream 3436 matching original audio/video stream received by the OAM based transmitter.

In accordance with the various embodiments described herein, orbital angular momentum (OAM) may be utilized to perform channel bonding across an increased or variable number of channels at the same frequency (or across multiple frequencies for even greater data transmission performance). Twist encoding techniques can be used to impart orbital angular momentum on signals, which is a result of the phase fronts of the waves rotating relative to their direction of propagation to create a vortex pattern (i.e., a pattern resembling a corkscrew). Orbital angular momentum can, in principle, take an infinite number of values which allows a large number of data channels to be created using a finite amount of bandwidth. The use of orbital angular momentum (OAM) encoded signals allows addition channels to be created over the same bandwidth (e.g., over the same frequency or wavelength) in order vastly increase the throughput of both wireless, wired and fiber-optic networks, where channel bonding can be performed as needed or desired across an increased or variable number of channels at the same frequency created using OAM.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the architectures may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
a distributor;
an input interface; and
output interfaces to corresponding communication channels that form a bonded channel group, where:
the distributor is in communication with the input interface and the output interfaces;
the distributor is configured to receive source data from the input interface and distribute the source data across at least one of the communication channels; and the communication channels comprising orbital angular momentum (OAM) channels, wherein the source data comprises a stream of packets and the distributor is configured to divide the stream of packets into at least one group of packets, wherein the distributor is configured to transmit the group of packets across at least one corresponding OAM channel of the OAM channels.

2. The system of claim 1, wherein the distributor is configured to transmit the group of packets across a corresponding plurality of the OAM channels.

3. The system of claim 2, wherein the distributor is configured to transmit the groups of packets across the at least one corresponding OAM channel in a different group order in relation to other OAM channels.

4. The system of claim 3, wherein the distributor is configured to transmit the groups of packets across the at least one corresponding OAM channel in a group order that is shifted in relation to the other OAM channels.

5. The system of claim 1, further comprising a modulator circuit in communication with the distributor and configured to multiplex the source data to the OAM channels using orthogonal frequency-division multiplexing (OFDM).

6. The system of claim 5, wherein the distributor is configured to apply orbital multiplexing techniques for distributing the source data across the OAM channels.

7. The system of claim 1, wherein the distributor is configured to determine when to enhance transmission reliability, and in response perform data interleaving on the source data.

8. The system of claim 1, wherein a first portion of the source data is modulated at a modulation frequency across a first channel of the OAM channels, where the first channel has a first orbital angular momentum and a second portion of the source data is also modulated at the modulation frequency over a second channel of the OAM channels, where the second channel has a second orbital angular momentum.

9. A system comprising:
a distributor;
an input interface; and
output interfaces to corresponding communication channels that form a bonded channel group, where:
the distributor is in communication with the input interface and the output interfaces;
the distributor is configured to receive source data from the input interface and distribute the source data across at least one of the communication channels; and
the communication channels comprising orbital angular momentum (OAM) channels,
wherein the distributor is configured to determine when to accelerate transfer of the source data, and in response, transfer selected packets of the source data across a single OAM channel of the OAM channels without redundancy.

10. A method comprising:
receiving a packet stream;
dividing the packet stream into communication units;
identifying a bonded channel group of communication channels among a set of available communication channels;
distributing the communication units across the bonded channel group, where the communication channels of the bonded channel group have a different orbital state from one another;
transmitting a first group of communication units across a first communication channel in the bonded channel group having a first orbital angular momentum in a first group order, and
transmitting the first group of communication units across a second communication channel in the bonded channel group having a second orbital angular momentum in a second group order, wherein the transmitting of the first group of communication units across the first and second communication channels occurs simultaneously.

11. The method of claim 10, further comprising multiplexing the communication units across the communication channels using orthogonal frequency-division multiplexing (OFDM).

12. The method of claim 10, wherein the second group order comprises a shifted version of the first group order.

13. The method of claim 10, where distributing further comprises: distributing the communication units in a different order to the communication channels in the bonded channel group.

* * * * *